(12) United States Patent
Blessing et al.

(10) Patent No.: US 10,843,511 B2
(45) Date of Patent: Nov. 24, 2020

(54) CHANNEL VALVE ASSEMBLY FOR A TIRE PRESSURE MANAGEMENT SYSTEM

(71) Applicant: DANA HEAVY VEHICLE SYSTEMS GROUP, LLC, Maumee, OH (US)

(72) Inventors: Christopher D. Blessing, Toledo, OH (US); Kurt P. Gillen, Perrysburg, OH (US); Jason M. Sidders, Perrysburg, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 332 days.

(21) Appl. No.: 15/750,660

(22) PCT Filed: Aug. 5, 2016

(86) PCT No.: PCT/US2016/045744
§ 371 (c)(1),
(2) Date: Feb. 6, 2018

(87) PCT Pub. No.: WO2017/024216
PCT Pub. Date: Feb. 9, 2017

(65) Prior Publication Data
US 2018/0229558 A1    Aug. 16, 2018

Related U.S. Application Data

(60) Provisional application No. 62/201,696, filed on Aug. 6, 2015, provisional application No. 62/286,153, filed on Jan. 22, 2016.

(51) Int. Cl.
*B60C 23/00* (2006.01)
*F16K 27/02* (2006.01)
(Continued)

(52) U.S. Cl.
CPC .. *B60C 23/00354* (2020.05); *B60C 23/00372* (2020.05); *F16K 11/0716* (2013.01);
(Continued)

(58) Field of Classification Search
CPC ............ B60C 23/003; B60C 23/00354; B60C 23/00372; F16K 11/0716; F16K 27/003;
(Continued)

(56) References Cited

U.S. PATENT DOCUMENTS

| 3,456,676 A | 7/1969 | Stuck |
| 3,489,166 A | 1/1970 | Williams |

(Continued)

FOREIGN PATENT DOCUMENTS

| DE | 2630511 | 1/1978 |
| DE | 102008062072 | 6/2010 |

(Continued)

OTHER PUBLICATIONS

Office Action dated Jun. 6, 2019 for U.S. Appl. No. 15/568,613 (pp. 1-10).

(Continued)

*Primary Examiner* — Kip T Kotter
(74) *Attorney, Agent, or Firm* — McCoy Russell LLP

(57) ABSTRACT

The present invention relates to a valve assembly system including channel valve assemblies. More particularly, the invention relates to a valve assembly system including channel valve assemblies and connecting modules and the tire pressure management system made therewith.

19 Claims, 14 Drawing Sheets

(51) Int. Cl.
*F16K 27/04* (2006.01)
*F16K 11/07* (2006.01)
*F16K 27/00* (2006.01)

(52) U.S. Cl.
CPC .......... *F16K 27/003* (2013.01); *F16K 27/029* (2013.01); *F16K 27/0263* (2013.01); *F16K 27/041* (2013.01)

(58) Field of Classification Search
CPC ... F16K 27/0263; F16K 27/029; F16K 27/041
See application file for complete search history.

(56) References Cited

U.S. PATENT DOCUMENTS

| | | |
|---|---|---|
| 3,724,488 A | 4/1973 | Featherstone |
| 3,747,626 A | 7/1973 | Valentino |
| 3,789,867 A | 2/1974 | Yabor |
| 4,171,119 A | 10/1979 | Lamson |
| 4,269,223 A | 5/1981 | Carter |
| 4,431,043 A | 2/1984 | Goodell |
| 4,470,506 A | 9/1984 | Goodell |
| 4,480,580 A | 11/1984 | Nalence |
| 4,641,698 A | 2/1987 | Bitonti |
| 4,678,017 A | 7/1987 | Schultz |
| 4,708,184 A | 11/1987 | Pechar |
| 4,744,399 A | 5/1988 | Magnuson |
| 4,765,385 A | 8/1988 | McGeachy |
| 4,768,574 A | 9/1988 | Probst |
| 4,782,878 A | 11/1988 | Mittal |
| 4,848,391 A | 7/1989 | Miller |
| 4,862,938 A | 9/1989 | Mittal |
| 4,895,199 A | 1/1990 | Magnuson |
| 4,905,724 A | 3/1990 | Ranalletta |
| 4,922,946 A | 5/1990 | Boulicault |
| 5,029,604 A | 7/1991 | Spektor |
| 5,141,589 A | 8/1992 | Mittal |
| 5,181,977 A | 1/1993 | Gneiding |
| 5,253,687 A | 10/1993 | Beverly |
| 5,261,471 A | 11/1993 | Freigang |
| 5,293,919 A | 3/1994 | Olney |
| 5,309,969 A | 5/1994 | Mittal |
| 5,411,051 A | 5/1995 | Olney |
| 5,413,159 A | 5/1995 | Olney |
| 5,540,268 A | 7/1996 | Mittal |
| 5,544,688 A | 8/1996 | Freigang |
| 5,587,698 A | 12/1996 | Genna |
| 5,647,927 A | 7/1997 | Mason |
| 5,713,386 A | 2/1998 | Heredia Batista |
| 5,868,155 A | 2/1999 | Hutton |
| 5,927,337 A | 7/1999 | Lamantia |
| 6,142,168 A | 11/2000 | Sumrall |
| 6,209,350 B1 | 4/2001 | Kimble |
| 6,250,327 B1 | 6/2001 | Freignang et al. |
| 6,302,138 B1 | 10/2001 | Sumrall |
| 6,374,852 B1 | 4/2002 | Olivas |
| 6,427,714 B2 | 8/2002 | Freigang |
| 6,561,017 B1 | 5/2003 | Claussen |
| 6,604,414 B1 | 8/2003 | Claussen |
| 6,634,375 B2 | 10/2003 | Olivas |
| 6,758,088 B2 | 7/2004 | Claussen |
| 6,865,930 B1 | 3/2005 | Claussen |
| 6,880,598 B2 | 4/2005 | Haunhorst |
| 6,943,673 B2 | 9/2005 | Skoff |
| 7,032,611 B1 | 4/2006 | Sheng |
| 7,051,585 B2 | 5/2006 | Claussen |
| 7,079,047 B2 | 7/2006 | Boulot |
| 7,188,638 B1 | 3/2007 | Peach |
| 7,191,796 B1 | 3/2007 | Rehmert, Jr. |
| 7,261,121 B2 | 8/2007 | Bordonaro |
| 7,434,455 B2 | 10/2008 | Alff |
| 7,437,920 B2 | 10/2008 | Beverly |
| 7,686,051 B2 | 3/2010 | Medley |
| RE41,756 E | 6/2010 | Claussen |
| 7,857,173 B2 | 12/2010 | Bolyard, Jr. |
| 8,113,234 B2 | 2/2012 | Campau |
| 8,136,561 B2 | 3/2012 | Sandoni |
| 8,256,447 B2 | 9/2012 | Badstue |
| 8,307,868 B2 | 11/2012 | Medley |
| 8,307,869 B2 | 11/2012 | Medley |
| 8,356,620 B2 | 1/2013 | Colussi |
| 8,596,560 B2 | 12/2013 | Morgan |
| 8,844,596 B2 | 9/2014 | Medley |
| 9,278,587 B2 | 3/2016 | Honig |
| 9,296,264 B2 | 3/2016 | Mozingo |
| 9,308,788 B2 | 4/2016 | Fazekas |
| 9,493,042 B2 | 11/2016 | Gillen |
| 9,573,428 B2 | 2/2017 | Sidders |
| 10,214,059 B2 * | 2/2019 | Gillen .................. B60C 23/003 |
| 2002/0134428 A1 | 9/2002 | Gabelmann |
| 2006/0225798 A1 | 10/2006 | Bordonaro |
| 2006/0283509 A1* | 12/2006 | Narita ................. F15B 13/0814 137/596.16 |
| 2008/0223457 A1 | 9/2008 | Kobziar |
| 2009/0032619 A1 | 2/2009 | Morgan |
| 2010/0147387 A1* | 6/2010 | Medley ................. B60C 23/003 137/1 |
| 2011/0089361 A1* | 4/2011 | Renninger ........... F16K 27/003 251/367 |
| 2011/0175716 A1* | 7/2011 | Medley ................. B60C 23/002 340/442 |
| 2011/0221261 A1 | 9/2011 | Eaton |
| 2011/0272618 A1 | 11/2011 | Mosler |
| 2011/0308637 A1 | 12/2011 | Tsiberidis |
| 2011/0315235 A1 | 12/2011 | Colefax |
| 2012/0059546 A1 | 3/2012 | Wilson |
| 2012/0138826 A1 | 6/2012 | Morris |
| 2013/0146193 A1* | 6/2013 | Stephenson .......... B60C 23/003 152/415 |
| 2014/0224399 A1 | 8/2014 | Mozingo |
| 2015/0020931 A1 | 1/2015 | Kawamura |
| 2015/0174972 A1* | 6/2015 | Zhou .................... B60C 23/003 340/447 |
| 2018/0229558 A1 | 8/2018 | Blessing |
| 2018/0236826 A1 | 8/2018 | Blessing |

FOREIGN PATENT DOCUMENTS

| | | |
|---|---|---|
| EP | 0164916 | 12/1985 |
| EP | 0206949 A1 | 12/1986 |
| EP | 2522532 | 11/2012 |
| FR | 1432885 | 3/1966 |
| FR | 2149276 | 3/1973 |
| FR | 2619762 | 3/1989 |
| GB | 410531 | 5/1934 |
| GB | 646891 | 11/1950 |
| GB | 1037494 | 7/1966 |
| GB | 1346130 | 2/1974 |
| GB | 2262921 A | 7/1993 |
| GB | 2312268 | 10/1997 |
| GB | 2348268 | 9/2000 |
| WO | 9114120 | 9/1991 |
| WO | 2002062595 | 8/2002 |
| WO | 2004030952 | 4/2004 |
| WO | 2010094067 | 8/2010 |
| WO | 2011028346 | 3/2011 |
| WO | 2014028142 | 2/2014 |
| WO | 2014151418 A1 | 9/2014 |

OTHER PUBLICATIONS

European Patent Office, International Search Report and Written Opinion issued in international application No. PCT/U2016/029156, dated Jun. 28, 2016, 10 pages.

European Patent Office, International Search Report and Written Opinion issued in international application No. PCT/U2016/045765, dated Nov. 4, 2016, 12 pages.

European Patent Office, International Search Report and Written Opinion issued in international application No. PCT/U2016/045744, dated Oct. 28, 2016, 14 pages.

(56) References Cited

OTHER PUBLICATIONS

Office Action dated Jul. 11, 2018 for U.S. Appl. No. 15/289,414 (pp. 1-8).

* cited by examiner

CHANNEL VALVE ASSEMBLY FOR A TIRE PRESSURE MANAGEMENT SYSTEM

CROSS-REFERENCE TO RELATED APPLICATIONS

This application claims the benefit of U.S. Provisional Application No. 62/201,696 filed on Aug. 6, 2015 and U.S. Provisional Application No. 62/286,153 filed on Jan. 22, 2016, which are herein incorporated by reference.

FIELD OF INVENTION

The present invention relates to a valve assembly system including channel valve assemblies. More particularly, the invention relates to a valve assembly system including channel valve assemblies and connecting modules and the tire pressure management system made therewith.

BACKGROUND OF THE INVENTION

Certain types of vehicles such as, for example, commercial vehicles require that the tire pressure of their wheel assemblies be periodically adjusted for optimal performance. Tire pressure management systems can be utilized to manually and/or automatically adjust the pressure within one or more wheel assemblies. Typically, tire pressure management systems include a control unit. Such control units house valving and other plumbing utilized to direct pressurized air through the system. Unfortunately, the valving and plumbing known in the prior art systems is not easily adaptable to add additional channels to the system should such additions be desired. Also, the valving known in the art is expensive and bulky.

Therefore, it would be advantageous to develop a new system that is inexpensive and requires less space than the known assemblies. A tire pressure management system utilizing channel valve assemblies would also be desirable and have certain advantages over the known systems.

SUMMARY OF INVENTION

A channel valve assembly for a tire pressure management system is provided including a valve housing including a front outer surface, a rear outer surface, two side outer surfaces, a first opening, a first port, a second opening, a second port and a valve cavity, wherein each of the first opening, first port, second opening and second port are in fluid communication with the valve cavity. The first port extends from a first side outer surface and second opening extends from a second side outer surface and the first port and second opening are parallel to each other. The second port extends from the front outer surface of the valve housing and is perpendicular to the first opening, second opening and first port. The valve cavity is in communication with a fluid conduit through the first port and the second opening and is in selective communication with a source of pressurized air through the second port. At least one of the front outer surface, the rear outer surface and two side outer surfaces of the valve housing include structural support elements that extend therefrom. A solenoid is positioned within the valve cavity and extends through the first opening.

A valve assembly system includes at least two channel valve assemblies connected to a connecting module to allow fluid communication between the channel valve assemblies. The connecting module includes an outer surface, a first connecting module port and a second connecting module port in fluid communication with each other, and a cavity including a conduit that is part of the fluid conduit extending from the first connecting module port to the second connecting module port. The first connecting module port connects to the second opening of a first channel valve assembly and the second connecting module connects the first port of a second channel valve assembly. The outer surface of the connecting module includes structural support elements that extend therefrom.

The valve assembly system can further include a supply valve assembly, a control valve assembly and a second connecting module. The control valve assembly is connected to a first channel valve assembly and the supply valve assembly is connected to a second channel valve assembly. The second connecting module is connected to the control valve assembly and the supply valve assembly. The channel valve assemblies, supply valve assembly, control valve assembly and connecting modules are in selective fluid communication with the fluid conduit.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
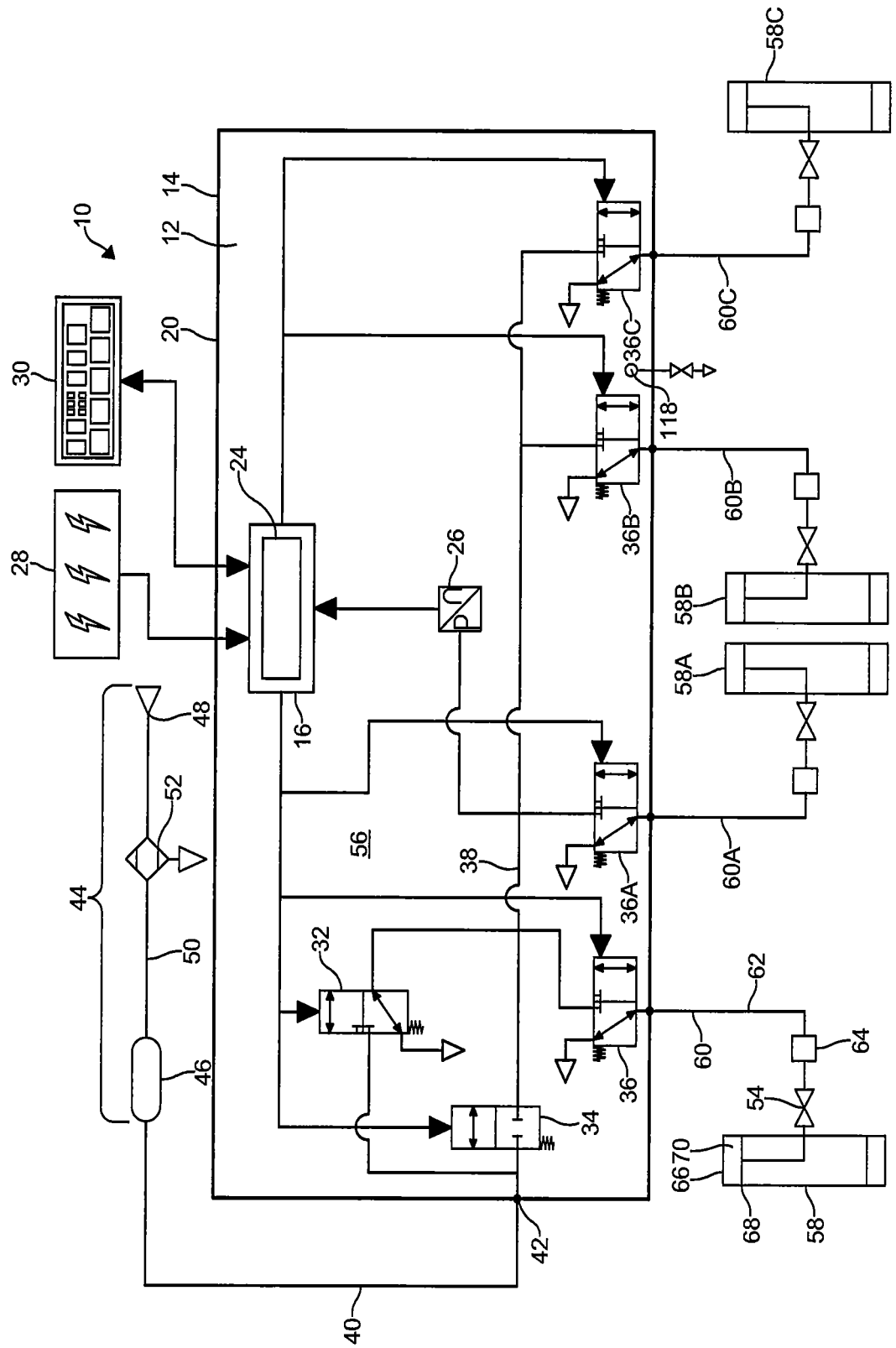
FIG. 1 is a schematic view of an embodiment of a tire pressure management system in accordance with the invention.

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. In addition, although they may not be, like elements in various embodiments may be commonly referred to with like reference numerals within this section of the application.

A valve assembly system and a tire pressure management system made therewith is described below.

Figure 8:
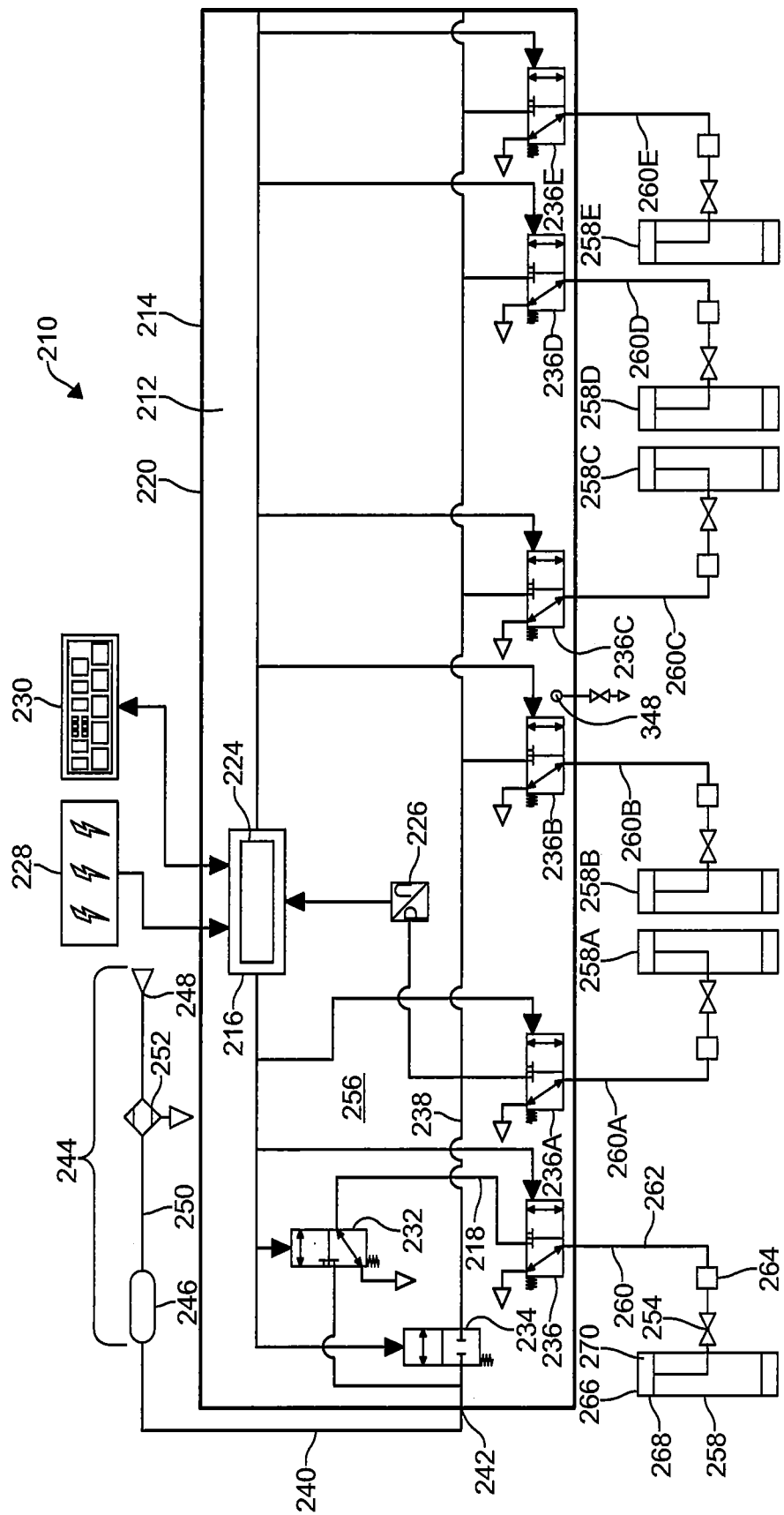
FIG. 8 is a schematic view of another embodiment of a tire pressure management system in accordance with the invention.
Figure 9:
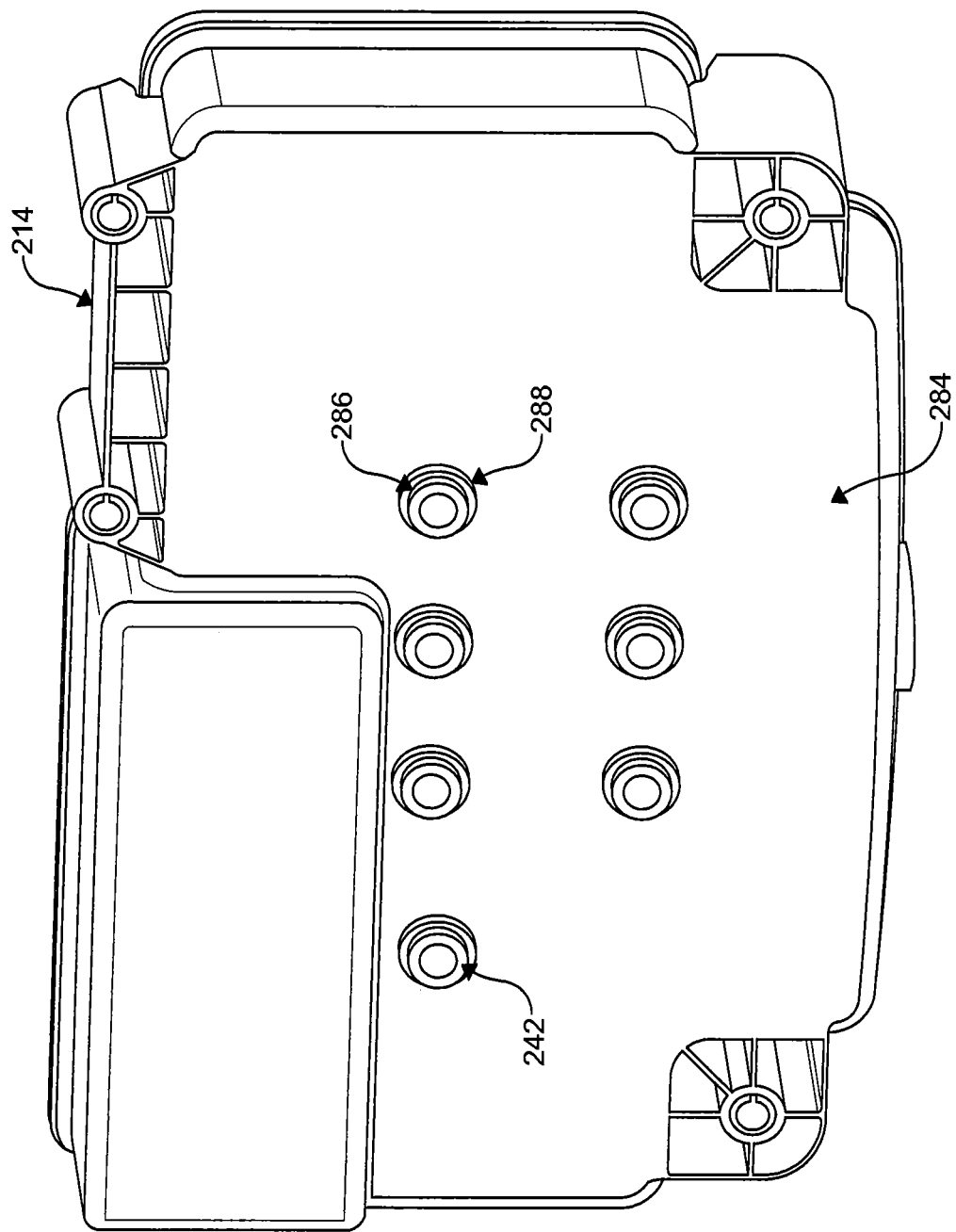
FIG. 9 is an isometric view of an embodiment of a control unit of the tire pressure management system of FIG. 8.

An embodiment of the tire pressure management system 10, 210 is illustrated in FIGS. 1 and 8. The tire pressure management system 10, 210 is provided on a vehicle (not depicted). A preferred type of vehicle is a commercial vehicle. Commercial vehicles are known in the art. However, the tire pressure management system 10, 210 may also have applications in vehicles for both light and heavy duty and for passenger and off-highway vehicles. Furthermore, it would be understood by one of ordinary skill in the art that the tire pressure management system 10, 210 could have industrial, locomotive, military and aerospace applications.

In certain embodiments, the tire pressure management system 10, 210 may operate as described in published PCT patent application no. WO 2014/151418, the entire disclosure of which is hereby incorporated by reference. The tire pressure management system 10, 210 is configured to adjust tire pressure. Preferably, the tire pressure management system 10, 210 can increase and maintain tire pressure. However, the tire pressure management system 10, 210 may also be utilized to increase and decrease tire pressure. The tire pressure management system 10, 210 will be described in connection with a fluid. For the purposes of describing the tire pressure management system 10, 210, the fluid will hereinafter be referred to as air. However, alternative fluids are capable of being utilized.

The tire pressure management system 10, 210 includes a control unit 12, 212. The control unit 12, 212 is configured to enable measuring the tire pressure of one or more wheel assemblies and, if needed, increasing the tire pressure thereof. The control unit 12, 212 is also configured to enable venting of one or more portions of the tire pressure management system 10, 210

Referring now to FIGS. 1, 3, 8 and 10, the control unit 12, 212 includes a housing 14, 214 and a valve assembly system 15, 215. An electronic control portion 16, 216 and a pneumatic control portion 18, 218 are provided within the control unit housing 14, 214 as depicted in FIGS. 1 and 8. The electronic control portion 16, 216 and pneumatic control portion 18, 218 communicate to direct pressurized air through the pressure management system 10, 210.

The electronic control portion 16, 216 may include a microprocessor 24, 224 operating under the control of a set of programming instructions, which may also be referred to as software. The electronic control portion 16, 216 may include a memory (not depicted) in which programming instructions are stored. The memory can also store identification codes, tire pressure records and/or user inputs over a period of time.

The electronic control portion 16, 216 may receive input signals from a pressure sensor 26, 226, power supply 28, 228 and one or more additional sensors (not depicted) including, but not limited to, a load sensor and a speed sensor. The load sensor and speed sensor may each be conventional in the art. The pressure sensor 26, 226 may also be referred to as a pressure transducer. The electronic control portion 16, 216 may also receive input signals from an operator control device 30, 230.

The operator control device 30, 230 may allow an operator of the vehicle to exert a certain level of control over the tire pressure management system 10, 210. The operator control device 30, 230 may be conventional in the art. The operator control device 30, 230 permits an operator of the vehicle to transmit control signals to the electronic control portion 16, 216 to adjust the tire pressure.

The electronic control portion 16, 216 outputs signals to one or more members of the pneumatic control portion 18, 218. Preferably, the electronic control portion 16, 216 outputs signals to a plurality of valve assemblies 32, 34, 36, 36A, 36B, 36C, 232, 234, 236, 236A, 236B, 236C, 236D, 236E included in the pneumatic control portion 18, 218. The output signals may be electrical current. Electrical current can be received by a valve assembly 32, 34, 36, 36A, 36B, 36C, 232, 234, 236, 236A, 236B, 236C, 236D, 236E to place the assembly in an open position or a closed position, respectively. Similarly, electrical current can be removed from the valve assembly 32, 34, 36, 36A, 36B, 36C, 232, 234, 236, 236A, 236B, 236C, 236D, 236E to place the assembly in an open position or a closed position, respectively. The electronic control portion 16, 216 may also output signals to a display device (not depicted). The display device may be included as a part of the operator control device 30, 230 or a freestanding device.

The pneumatic control portion 18, 218 includes a first fluid conduit 38, 238 provided within the control unit housing 14, 214. A supply port 42, 242 is positioned in the control unit housing 14, 214 and is in fluid communication with an air supply circuit 40, 240. The tire pressure management system 10, 210 includes a source of pressurized air 44, 244. Pressurized air is supplied to control unit 12, 212 from the source of pressurized air 44, 244 via the air supply circuit 40, 240. Preferably, the source of pressurized air 44, 244 includes a reservoir 46, 246 including, but not limited to a wet tank. Preferably, a compressor 48, 248 is attached to the vehicle and in fluid communication with the wet tank 46, 246 via a supply conduit 50, 250. The compressor 48, 248 supplies pressurized air to the wet tank 46, 246 for storage therein. In certain embodiments, a drier 52, 252 is interposed in the air supply circuit 40, 240 for removing water from the air. A filter (not depicted) may also be interposed in the air supply circuit 40, 240.

The pressurized air is utilized to measure the tire pressure and, if needed, open one or more wheel valves 54, 254 and increase the tire pressure. The pressurized air provided in the air supply circuit 40, 240 and supplied from the source of pressurized air 44, 244 includes air at a certain pressure. The pressure sensor 26, 226 measures the pressure of the pressurized air provided in the air supply circuit 40, 240. It is preferred that at the time the method is practiced that the pressurized air provided in the air supply circuit 40, 240 is at a pressure which is greater than the tire pressure. Preferably, the pressure of the pressurized air provided in the air supply circuit 40, 240 is equal to or greater than the target tire pressure so that the tire pressure can, if needed, be increased to the target tire pressure. In an embodiment, the pressure of the air provided in the air supply circuit 40, 240 is equal to the target tire pressure plus 5 psig or more.

The pressure sensor 26, 226 is provided within the control unit housing 14, 214 and is in fluid communication with the first fluid conduit 38, 238. The pressure sensor 26, 226 measures the pressure of the air within the first fluid conduit 38, 238. Thus, when the source of pressurized air 44, 244 is in fluid communication with the first fluid conduit 38, 238, the pressure sensor 26, 226 can measure the pressure of the air from the source of pressurized air 44, 244 by measuring the pressure of the air in the first fluid conduit 38, 238. Also, during certain operations, the pressure sensor 26, 226 may measure the pressure of the air in a fluid control circuit 60, 60A, 60B, 60C, 260, 260A, 260B, 260C, 260D, 260E by measuring the pressure of the air in the first fluid conduit 38, 238. Once the pressure of the air in the first fluid conduit 38, 238 has been measured, the pressure sensor 26, 226 can send a signal to the electronic control portion 16, 216.

As described above, the first fluid conduit 38, 238 is in fluid communication with the pressure sensor 26, 226, control valve assembly 32, 232 and supply valve assembly 34, 234. Also, as described above, the first fluid conduit 38, 238 is selectively in fluid communication with a chamber 56, 256. The first fluid conduit 38, 238 is also attached to and in fluid communication with one or more channel valve assemblies 36, 36A, 36B, 36C, 236, 236A, 236B, 236C, 236D, 236E.

The air supply port 42, 242 is provided as a portion of a supply valve assembly 34, 234. The supply valve assembly 34, 234 is in fluid communication with a control valve assembly 32, 232 and one or more channel valve assemblies 36, 36A, 36B, 36C, 236, 236A, 236B, 236C, 236D, 236E via the first fluid conduit 38, 238. Preferably, the control valve assembly 32, 232 and the supply valve assembly 34, 234 are of the solenoid valve variety. The control valve assembly 32, 232 and the supply valve assembly 34, 234 are operable from an open position through a closed position and provided within the control unit housing 14, 214. Preferably, the control valve assembly 32, 232 and the supply valve assembly 34, 234 are normally in the closed position.

In certain embodiments, the control valve assembly 32, 232 and the supply valve assembly 34, 234 may be and operate as described in published PCT patent application no. WO 2014/151418. The control valve assembly 32, 232 is utilized to communicate a small flow or bleed of air to the first fluid conduit 38, 238 and/or a fluid control circuit 60, 60A, 60B, 60C, 260, 260A, 260B, 260C, 260D, 260E. The supply valve assembly 34, 234 is utilized to communicate a flow of air from the source of pressurized air 44, 244 to the first fluid conduit 38, 238.

Preferably, one channel valve assembly 36, 36A, 36B, 36C, 236, 236A, 236B, 236C, 236D, 236E is provided for each wheel assembly 58, 58A, 58B, 58C, 258, 258A, 258B, 258C, 258D, 258E and each is attached to and in fluid communication with the first fluid conduit 38, 238. Preferably, each channel valve assembly 36, 36A, 36B, 36C, 236, 236A, 236B, 236C, 236D, 236E enables fluid communication between the first fluid conduit 38, 238 and a fluid control circuit 60, 60A, 60B, 60C, 260, 260A, 260B, 260C, 260D, 260E. Preferably, the channel valve assemblies 36, 36A, 36B, 36C, 236, 236A, 236B, 236C, 236D, 236E are similarly configured. Thus, for describing the features of the channel valve assemblies 36, 36A, 36B, 36C, 236, 236A, 236B, 236C, 236D, 236E only one channel valve assembly 36, 236 will be referred to below.

Preferably, each fluid control circuit 60, 60A, 60B, 60C, 260, 260A, 260B, 260C, 260D, 260E, 260D, 260E is similarly configured. Thus, for describing the features of the fluid control circuits 60, 60A, 60B, 60C, 260, 260A, 260B, 260C, 260D, 260E, only one fluid control circuit 60, 260 will be referred to below. Preferably, the fluid control circuit 60, 260 includes one or more fluid conduits 62, 262 a rotary joint assembly 64, 264 and/or a hose assembly (not depicted).

Preferably, each wheel assembly 58, 58A, 58B, 58C, 258, 258A, 258B, 258C, 258D, 258E is similarly configured. Thus, for describing the features of the wheel assembly 58, 58A, 58B, 58C, 258, 258A, 258B, 258C, 258D, 258E only one wheel assembly 58, 258 will be referred to below. The wheel assembly 58, 258 includes a tire 66, 266 and a wheel rim 68, 268. An axle may be coupled to the wheel rim 68, 268. Space 70, 270 between the tire 66, 266 and the wheel rim 68, 268 is configured to house pressurized air.

The pressurized air housed within the space 70, 270 is referred to herein as "tire pressure." Tire pressure is increased by the addition of pressurized air into the space 70, 270 and decreased by the removal of air from the space 70, 270. Preferably, the tire pressure is equal to a target tire pressure. The target tire pressure can be selected by an operator of the vehicle to be a desired pressure. After the target tire pressure is selected, it can be programmed into the control unit 12, 212 via the electronic control portion 16, 216. The target tire pressure can also be pre-programmed into the control unit 12, 212. To ascertain if the tire pressure is equal to the target tire pressure, the tire pressure is determined. As noted above, the control unit 12, 212 is configured to enable determining the tire pressure. A preferred method of determining the tire pressure is described in published PCT patent application no. WO 2015/084708.

Preferably, the wheel valve 54, 254 is attached to the wheel assembly 58, 258. The wheel valve 54, 254 separates the fluid control circuit 60, 260 from the wheel assembly 58, 258 and is utilized to retain pressurized air therein. Also, the wheel valve 54, 254 allows the wheel assembly 58, 258 to selectively communicate with the control unit 12, 212 via the fluid control circuit 60, 260. The wheel valve 54, 254 may be of the check valve variety or the control valve variety.

When the channel valve assembly 36, 326 is in the open position, the first fluid conduit 38, 238 is in fluid communication with the fluid control circuit 60, 260. The fluid control circuit 60, 260 is capable of fluid communication with the wheel assembly 58, 258 via the wheel valve 54, 254. When the first fluid conduit 38, 238 is in fluid communication with the fluid control circuit 60, 260, a flow of air from the source of pressurized air 44, 244 can be directed to the wheel assembly 58, 258 via the channel valve assembly 36, 236 the fluid control circuit 60, 260 and the wheel valve 54, 254. Thus, the channel valve assembly 36, 236 is utilized to promote airflow from the source of pressurized air 44, 244 to the wheel assembly 58, 258.

Referring now to FIGS. 4-7, in one preferred embodiment, the channel valve assembly 36 includes a valve housing 74. A solenoid valve 72 is fitted within an opening 76 located in an upper portion 78 of the valve housing 74. Preferably, the valve housing 74 is formed in a unitary manner. More preferably, the valve housing 74 is formed with a rigid polymeric material and from an injection molding process.

Figure 2:
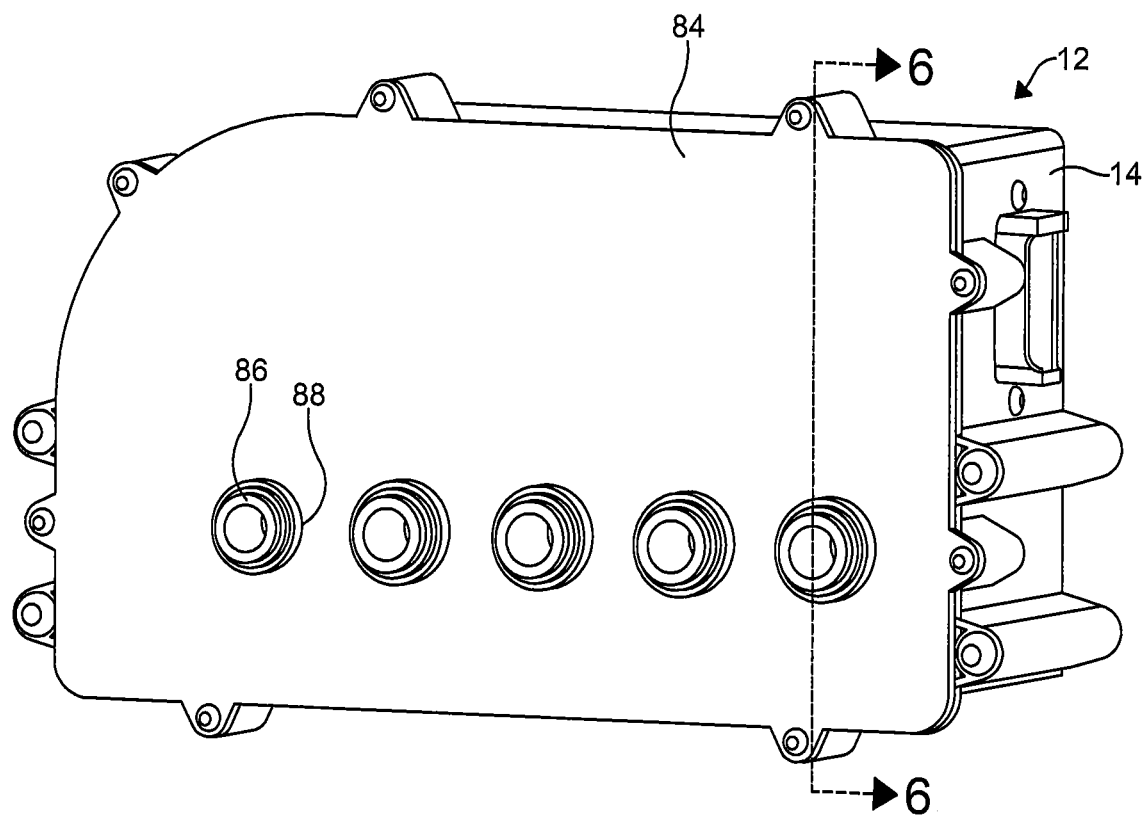
FIG. 2 is an isometric view of an embodiment of a control unit of the tire pressure management system of FIG. 1.
Figure 3:
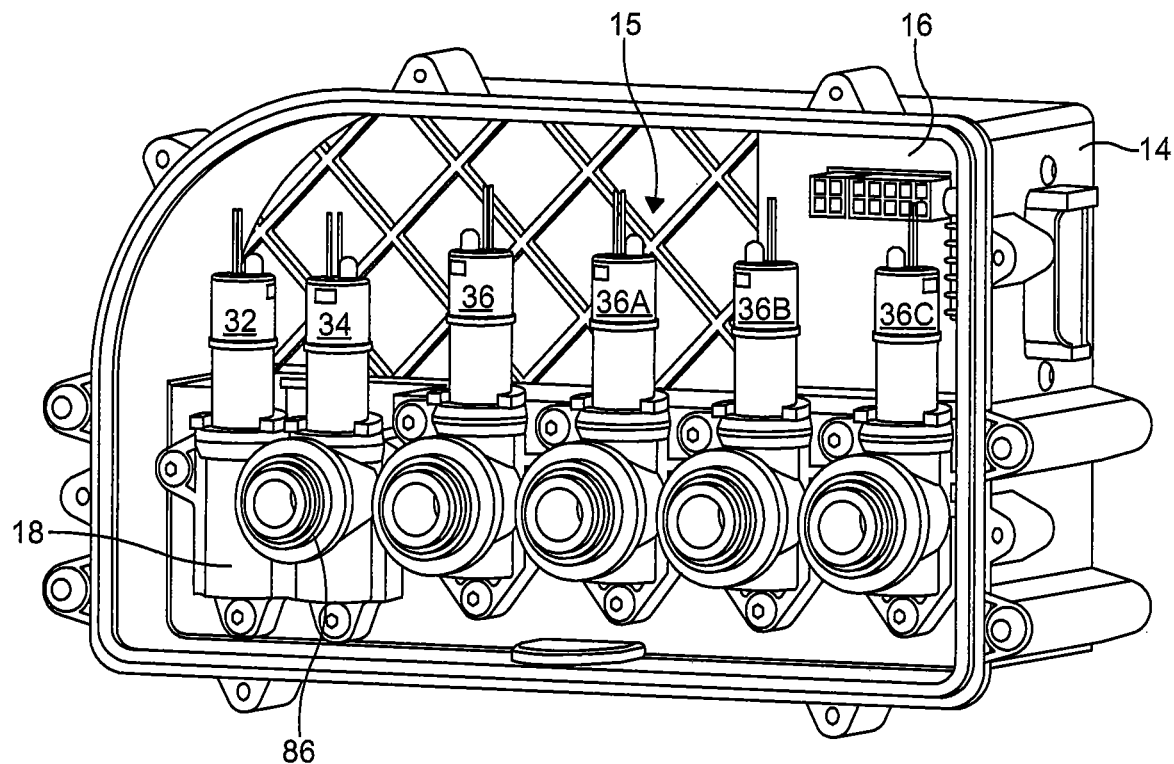
FIG. 3 is an isometric view of the control unit of FIG. 2 with a cover member removed depicting an orientation of an embodiment of a valve assembly system in accordance with the invention.
Figure 5:
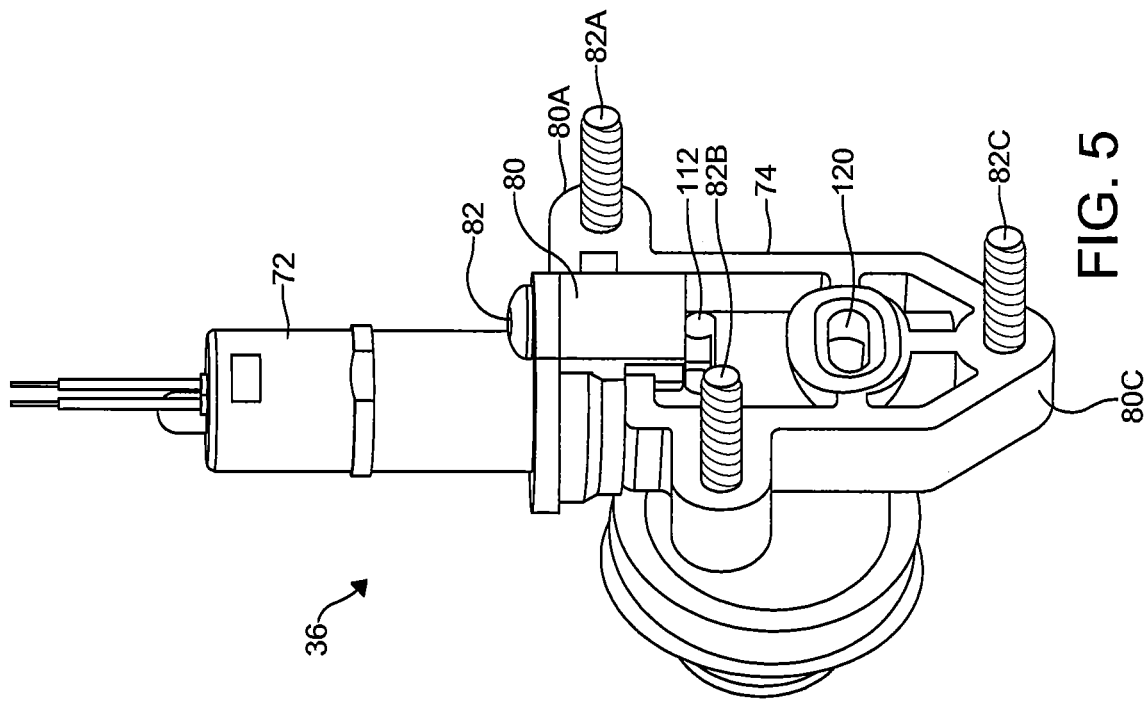
FIG. 5 is an isometric rear view of the channel valve assembly of FIG. 3.
Figure 4:
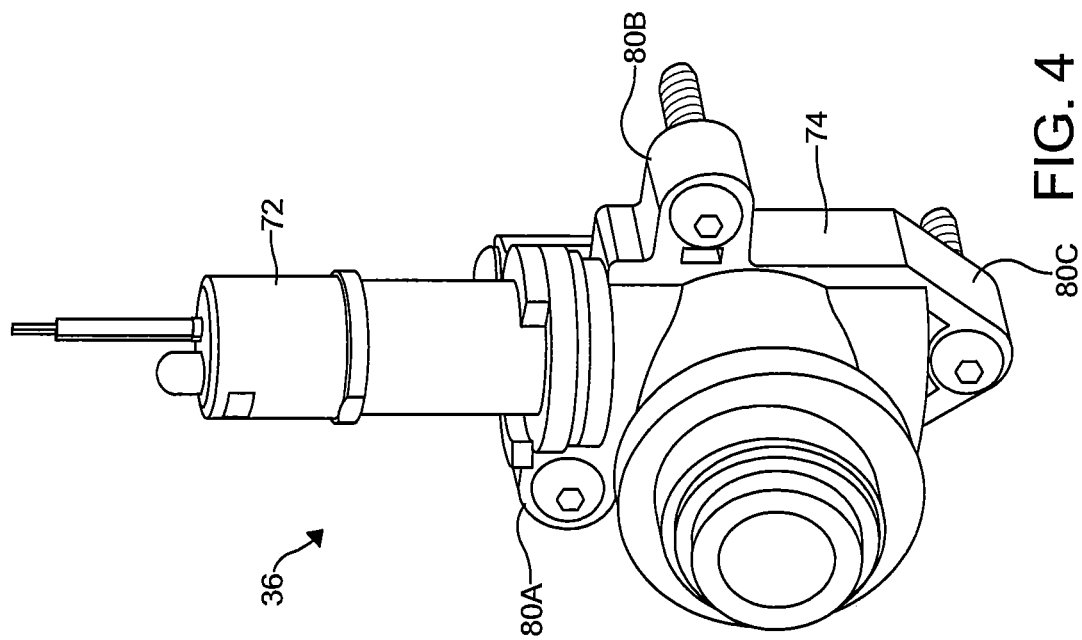
FIG. 4 is an isometric front view of the channel valve assembly of FIG. 3.
Figure 7:
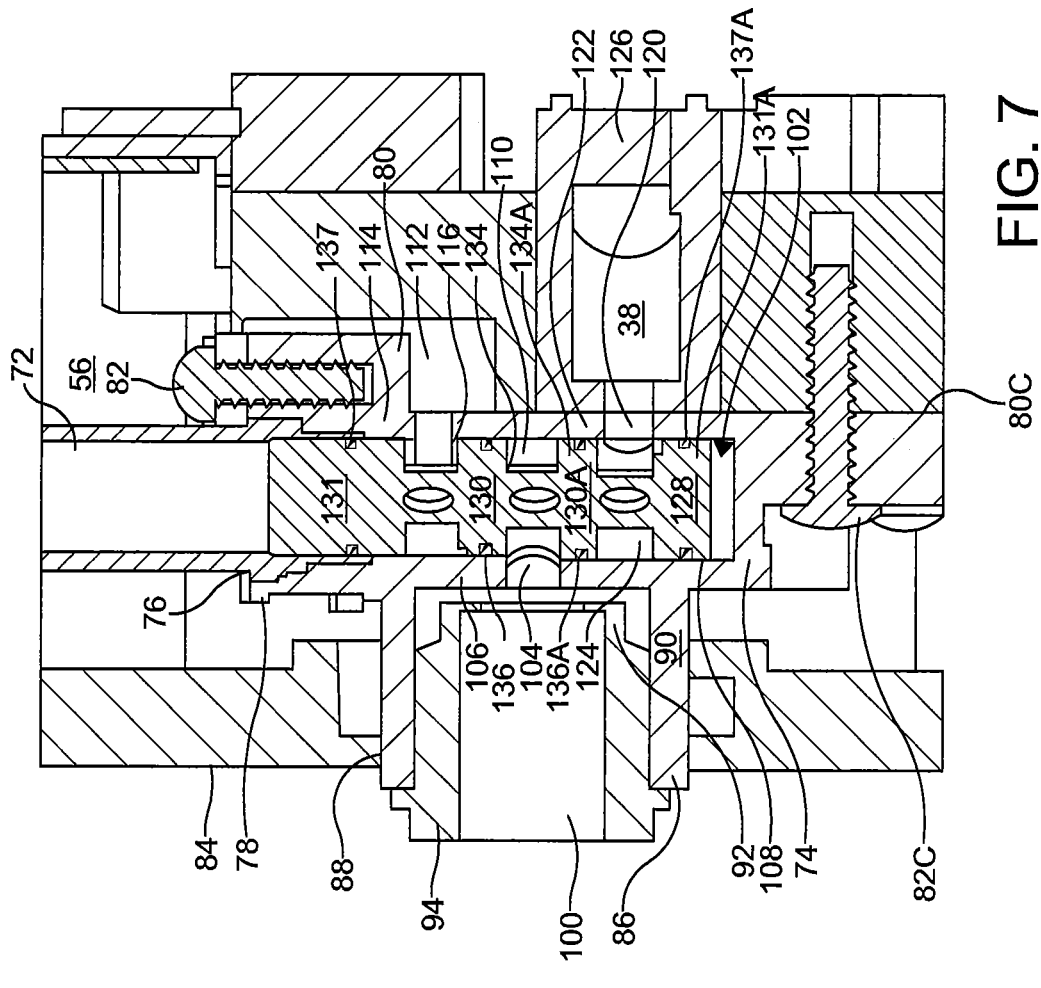
FIG. 7 is an enlarged view of a portion of the channel valve assembly of FIG. 6.

The valve housing 74 includes a plurality of attaching portions 80, 80A, 80B, 80C. The first attaching portion 80 is utilized to secure the solenoid valve 72 to the valve housing 74. The solenoid valve 72 is secured to the valve housing 74 by inserting a fastener 82 through the first attaching portion 80. The second attaching portion 80A, the third attaching portion 80B, and the fourth attaching portion are utilized to secure the valve housing 74 to the control unit housing 14 as depicted in FIG. 7. The valve housing 74 is secured to the control unit housing 14 by inserting a fastener 82A, 82B, 82C through each of the second, third, and fourth attaching portions 80A, 80B, 80C. As shown best in FIGS. 2 and 6, the valve housing 74 is engaged with a cover member 84 of the control unit housing 14. More particularly, a port 86 of the valve housing 74 extends through an opening 88 in the cover member 84.

Figure 6:
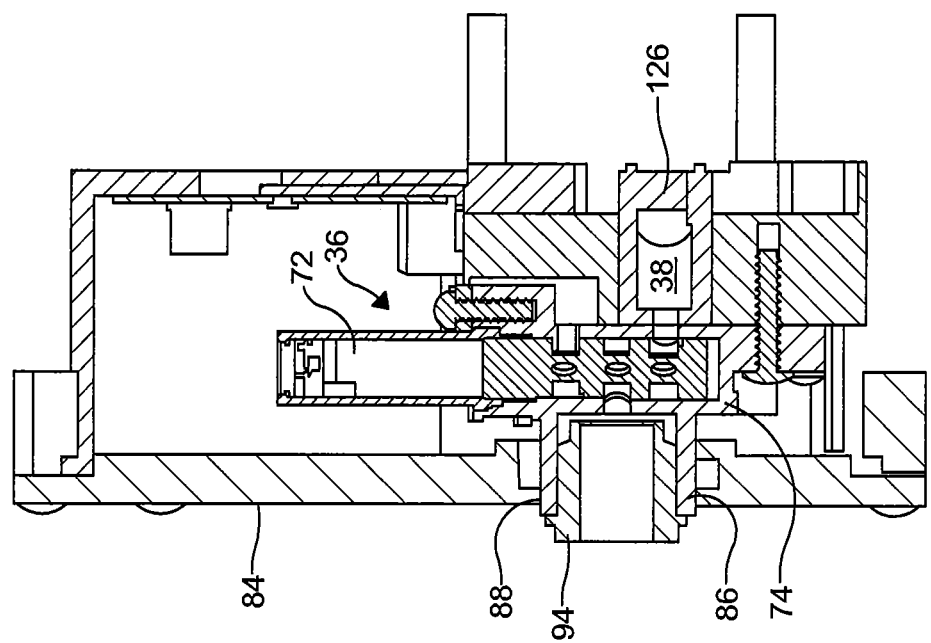
FIG. 6 is a cross-sectional view through the control unit of FIG. 2 along line 6-6 depicting portions of the channel valve assembly in accordance with the invention.

Referring now to FIGS. 3-7, the port 86 is of a generally cylindrical shape and is in a sealed relationship with the cover member 84. The port 86 includes a wall member 90 which defines a cavity 92 as shown in FIG. 7. The cavity 92 receives a module port insert 94 as shown in FIG. 6. The wall member 90 and the module port insert 94 may be attached to each other via a press fit.

The module port insert 94 is a generally cylindrical-shaped member. The module port insert 94 includes a retainer portion (not depicted) which defines an outer opening 100. The valve housing 74 is attached to the fluid control circuit 60 by inserting a portion of the fluid control circuit 60 through the outer opening 100 and by engagement of the retaining member with the portion of the fluid control circuit 60 inserted therein. The module port insert 94 also includes a sealing member (not depicted). The sealing member is provided around the portion of the fluid control circuit 60 inserted into the module port insert 94 to provide a seal between the fluid control circuit 60 and the port 86 of the valve housing 74. Preferably, the sealing member is an O-ring.

The valve housing 74 also includes a valve cavity 102. The valve cavity 102 and the port 86 are in fluid communication via a first fluid opening 104. The first fluid opening 104 is provided in a middle portion 106 of a sidewall 108 of the valve housing 74. The sidewall 108 partially defines the port 86 and the valve cavity 102. The wall member 90 and the sidewall 108 are attached to each other in a perpendicular relationship such that the wall member 90 extends from the sidewall 108 toward and through the cover member 84.

The first fluid opening 104 enables fluid communication between the valve cavity 102 and the module port insert 94 and the other portions of the tire pressure management system 10 in fluid communication with the channel valve assembly 36. More particularly, on a side of the valve cavity 102, the first fluid opening 104 is in fluid communication with a middle chamber 110 provided in the valve cavity 102. On an opposite side of the valve cavity 102, the first fluid opening 104 is in fluid communication with the air passageway 98 provided through the module port insert 94.

The channel valve assembly 36 is also in fluid communication with the atmosphere via a second fluid opening 112. The first fluid opening 104 and second fluid opening 112 are in a parallel relationship with each other and are selectively in fluid communication. The second fluid opening 112 is provided in an upper portion 114 of the sidewall 108 below the upper attaching portion 80.

The second fluid opening 112 enables fluid communication between the valve cavity 102 and the atmosphere. More particularly, on a side, the second fluid opening 112 is in fluid communication with an upper chamber 116 provided in the valve cavity 102. On an opposite side, the second fluid opening 112 is in fluid communication with the atmosphere via the chamber 56 formed in the control unit 12. The chamber 56 is in fluid communication with the atmosphere via a vent passage 118, which is illustrated in FIG. 1.

Referring back to FIG. 7, the channel valve assembly 36 is selectively in fluid communication with the first fluid conduit 38 via a third fluid opening 120. The first fluid opening 104 and third fluid opening 120 are in a parallel relationship with each other and are selectively in fluid communication. The third fluid opening 120 is provided in a lower portion 122 of the sidewall 108 below the second fluid opening 112.

The third fluid opening 120 enables fluid communication between the valve cavity 102 and the source of pressurized air 44 via the first fluid conduit 38. More particularly, on a side, the third fluid opening 120 is in fluid communication with a lower chamber 124 provided in the valve cavity 102. On an opposite side, the third fluid opening 120 is in fluid communication with a portion of the first fluid conduit 38 formed in a hollow adapter 126.

As illustrated in FIGS. 6-7, the valve cavity 102 is of a generally cylindrical shape. A valve cavity insert 128 is disposed within the valve cavity 102 to direct pressurized air through the valve cavity 102 and to and from the port 86. The valve cavity insert 128 is in a sealed relationship with the valve housing 74 and partially defines the middle chamber 110, the upper chamber 116 and the lower chamber 124.

The valve cavity insert 128 includes one or more annular portions 130, 130A and one or more cylindrical portions 131, 131A. Each annular portion 130, 130A is attached to an adjacent annular portion by a wall portion and each annular portion 130, 130A is attached to one of the cylindrical portions 131, 131A by a wall portion. A hole 134, 134A is provided through each annular portion 130, 130A to facilitate the movement of pressurized air through the valve cavity 102.

A sealing member 136, 136A, 137, 137A is provided around each annular portion 130, 130A and each cylindrical portion 131, 131A. Preferably, each sealing member 136, 136A, 137, 137A is disposed in a groove and is ring-shaped. Preferably, each sealing member 136, 136A, 137, 137A is formed from an elastomeric material. In an embodiment, each sealing member 136, 136A, 137, 137A is an O-ring. Each sealing member 136, 136A, 137, 137A provides a seal between one of the annular portions 130, 130A or one of the cylindrical portions 137, 137A and an inner surface of the sidewall 108 which allows the valve cavity insert 128 to be in a sealed relationship with the valve housing 74.

As noted above, the channel valve assembly 36 also includes the middle chamber 110, the upper chamber 116, and the lower chamber 124. The upper chamber 116 is in fluid communication with the chamber 56 formed in the control unit 12 via the second fluid opening 112. The upper chamber 116 is also selectively in fluid communication with the middle chamber 110. The upper chamber 116 is in fluid communication with the middle chamber 110 when, for example, it is desired to vent the fluid control circuit 60. As noted above, the lower chamber 124 is in fluid communication with the first fluid conduit 38 via the third fluid opening 104. The lower chamber 124 is also selectively in fluid communication with the middle chamber 110. The lower chamber 124 is in fluid communication with the middle chamber 110 when, for example, it is desired to determine, increase, and/or decrease the tire pressure.

The channel valve assembly 36 includes a biasing member (not depicted). The biasing member is attached to a poppet (not depicted). The poppet is moveable in response to the biasing member. The poppet moves between and seals against the annular portions 130, 130A of the valve cavity insert 128. The biasing member is moved and moves the poppet when the channel valve assembly 36 is energized or de-energized. In an embodiment, when a signal from the electronic control portion 16 is received by the solenoid valve 72, the biasing member urges the poppet toward the upper chamber 116. In another embodiment, when a signal from the electronic control portion 16 is not received by the solenoid valve 72, the biasing member urges the poppet toward the lower chamber 124.

When the biasing member urges the poppet toward the upper chamber 116, the poppet seals against an annular portion 130 of the valve cavity insert 128. When the poppet seals against the valve cavity insert 128, the lower chamber 124 is in fluid communication with the middle chamber 110. As noted above, the lower chamber 124 is in fluid communication with the middle chamber 110 to allow the tire pressure to be determined, increased, and/or decreased. When the biasing member urges the poppet toward the lower chamber 124, the poppet seals against another annular portion 130A of the valve cavity insert 128. When the poppet seals against the valve cavity insert 128, the upper chamber 116 is in fluid communication with the middle chamber 110. As noted above, the upper chamber 116 is in fluid communication with the middle chamber 110 to allow the fluid control circuit 60 to be vented.

Referring now to FIGS. 1-7, the channel valve assembly 36 is of the three-way variety. The channel valve assembly 36 includes the solenoid valve 72. As noted above, the channel valve assembly 36 receives a signal from the electronic control portion 16 as shown in FIG. 1. More particularly, the signal from the electronic control portion 16 is received by the solenoid valve 72. As noted above, the signal may be an electrical current which energizes the channel valve assembly 36 and places the valve assembly 36 in the open position. Similarly, the signal can be removed from the channel valve assembly 36 to de-energize the channel valve assembly 36 and place the channel valve assembly 36 in the closed position. For describing the tire pressure management system 10 provided herein, when an electrical current is received by the solenoid valve 72, the channel valve assembly 36 may be referred to as being "energized." When no electrical current is received by the solenoid valve 72 or when electrical current is removed from the solenoid valve 72, the channel valve assembly 36 may be referred to as being "de-energized." Preferably, the channel valve assembly 36 is normally de-energized and in the closed position.

When the channel valve assembly 36 is de-energized, the first fluid control circuit 60 is in fluid communication with the chamber 56. When the first fluid control circuit 60 is in fluid communication with the chamber 56 and if pressurized air is within the first fluid control circuit 60, venting the first fluid control circuit 60 occurs. The first fluid control circuit 60 is vented by directing a flow of pressurized air from the first fluid control circuit 60 through the channel valve assembly 36 into the chamber 56.

When the channel valve assembly 36 is energized, the first fluid conduit 38 is in fluid communication with the first fluid control circuit 60. When the first fluid conduit 38 is in fluid communication with the first fluid control circuit 60, pressurized air in the first fluid conduit 38 can be directed to the first fluid control circuit 60 to determine, increase, and/or decrease the tire pressure. Determining, increasing, and/or decreasing the tire pressure is achieved by directing a flow of pressurized air from the first fluid conduit 38 to the first fluid control circuit 60.

Figure 10:
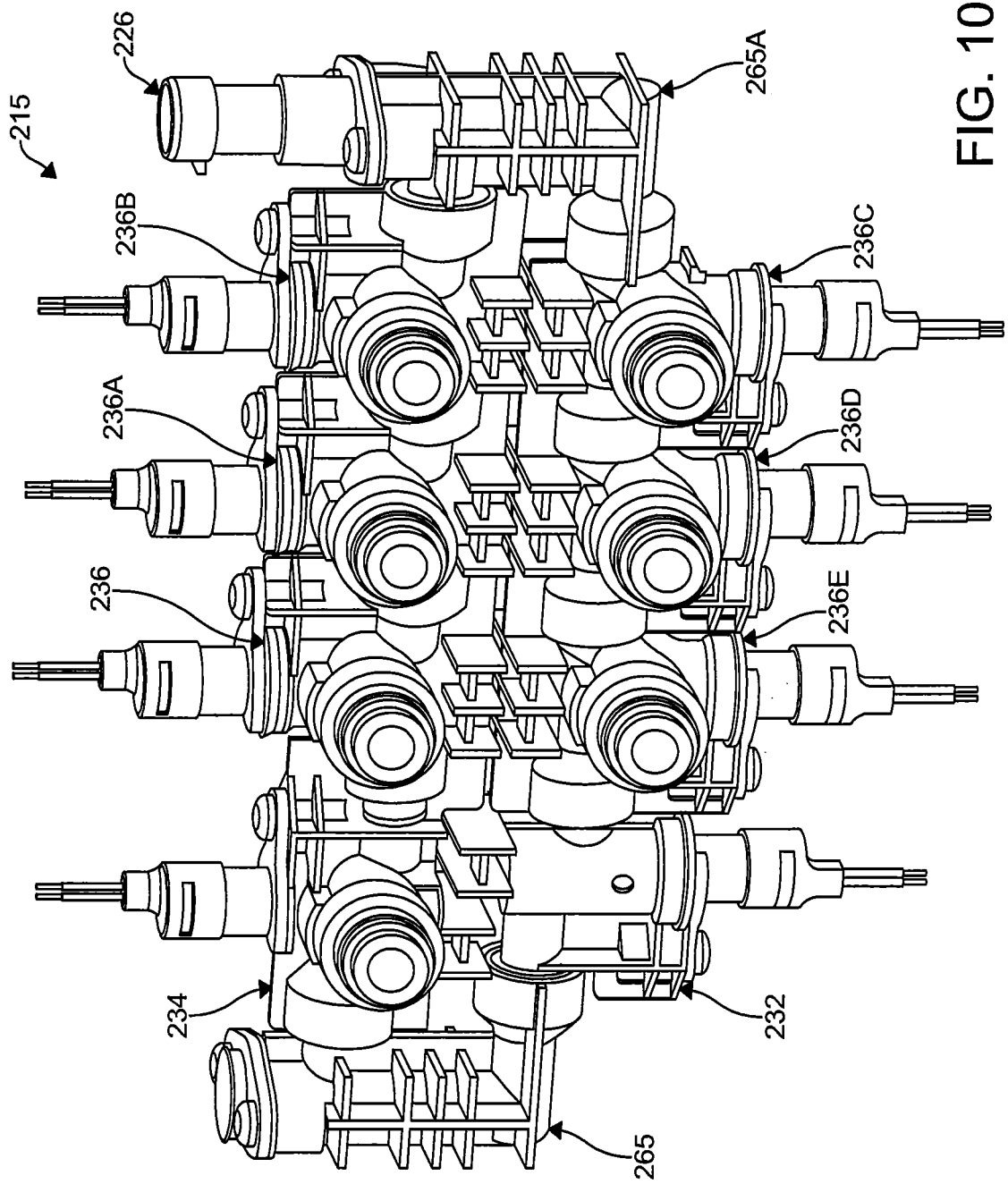
FIG. 10 is an isometric view of another embodiment of a valve assembly system in accordance with the invention.
Figure 11:
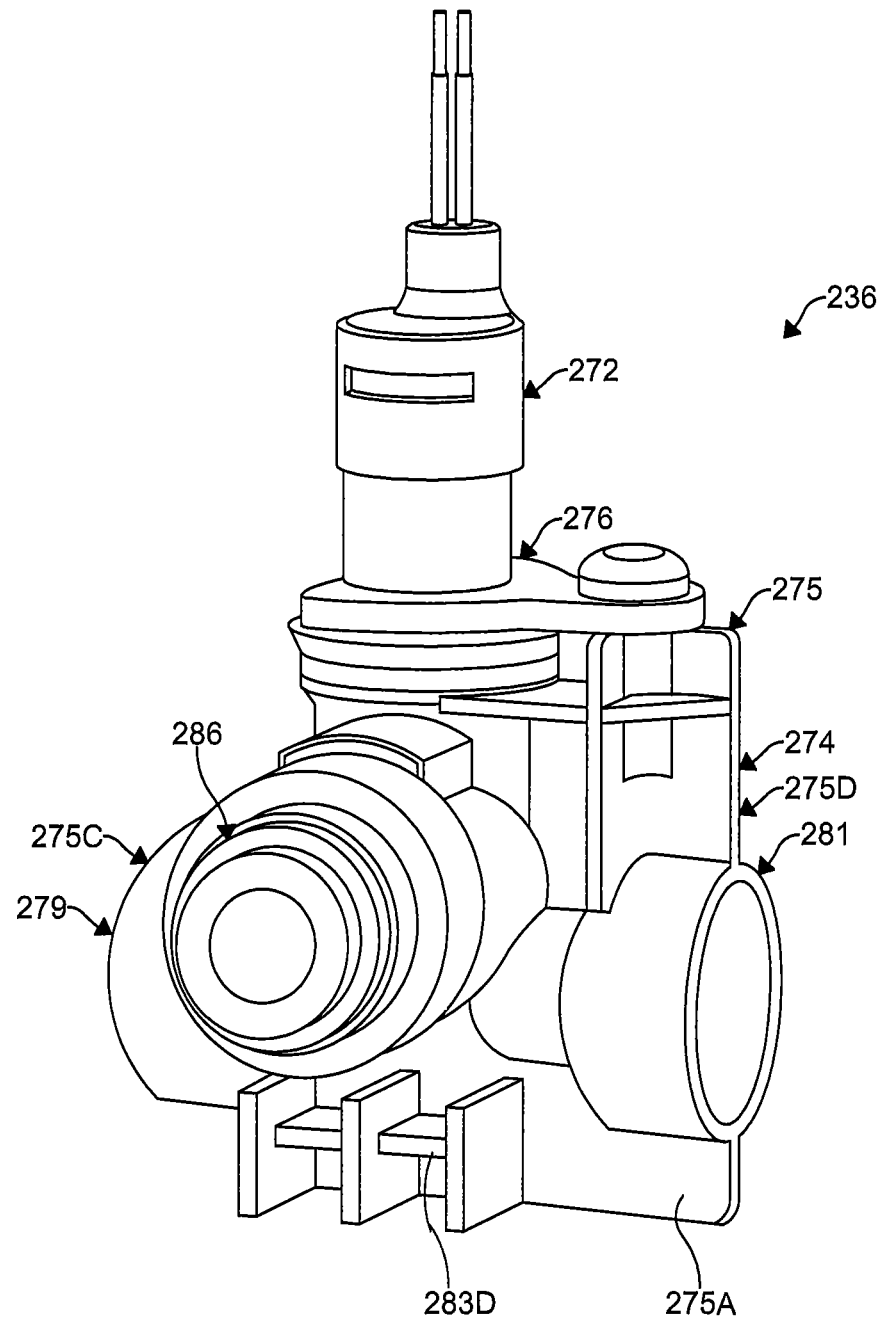
FIG. 11 is an isometric front view of another channel valve assembly in accordance with the invention.
Figure 12:
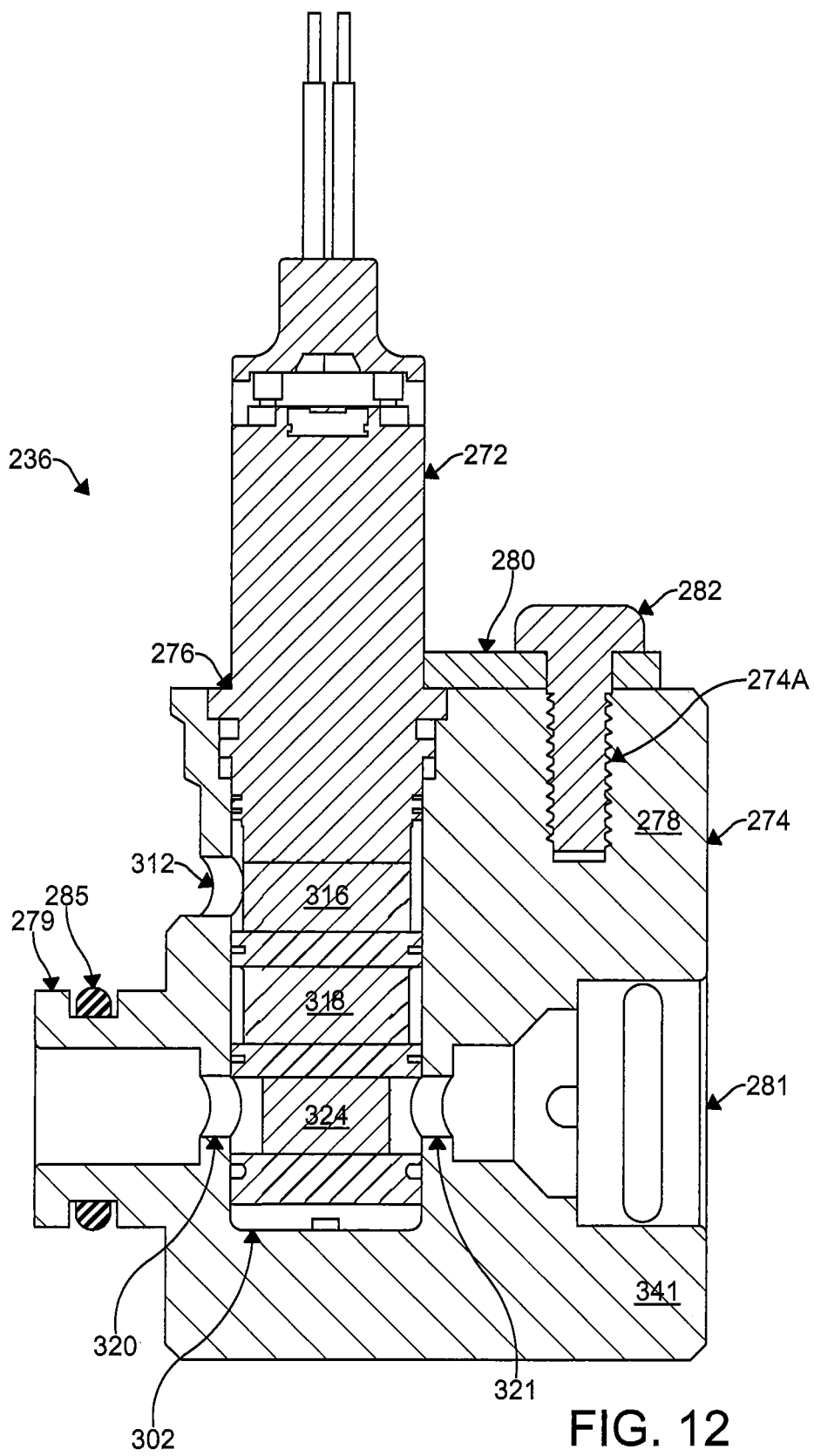
FIG. 12 is a cross-sectional view through the channel valve assembly of FIG. 11 depicting portions of the channel valve assembly.

Referring now to FIG. 10, in another preferred embodiment the valve assembly system 215 includes a channel valve assembly 236. The channel valve assembly 236 is of the three-way variety. The channel valve assembly 236 includes a solenoid valve 272 and a valve housing 274 as shown in FIG. 11. The valve housing 274 includes an outer surface 275 including a front outer surface 275A, a rear outer surface 275B, and at least two side outer surfaces 275B, 275D. The solenoid valve 272 is fitted within a first opening 276 located in an upper portion 278 of the valve housing 274 as shown in FIG. 12. Preferably, the valve housing 274 is formed in a unitary manner. More preferably, the valve housing 274 is formed with a rigid polymeric material and from an injection molding process.

Referring now to FIGS. 11 and 12, the valve housing 274 includes the first opening 276, a first port 279, a second opening 281 and a second port 286. The first port 279 and second opening 281 are parallel to each other and perpendicular to the first opening 276. The second port 286 is perpendicular to the first opening 276. First port 279 and second opening 281 extend away from the center of the valve housing 274 in opposite directions. The first port 279 extends from a first side outer surface 275C and the second opening 281 extends from a second side outer surface 275D. The second port 286 extends from the front outer surface 275A.

Referring now to FIG. 12, in one embodiment the valve housing 274 includes an attaching portion 280. The attaching portion 280 is utilized to secure the solenoid valve 272 to the valve housing 274. The attaching portion 280 is placed around the solenoid valve 272 on the outer surface of the valve housing 274 above. The solenoid valve 272 is secured to the valve housing 274 by inserting a fastener 282 that extends through the attaching portion 280 and into a receiving portion 274A in valve housing 274.

Figure 16:
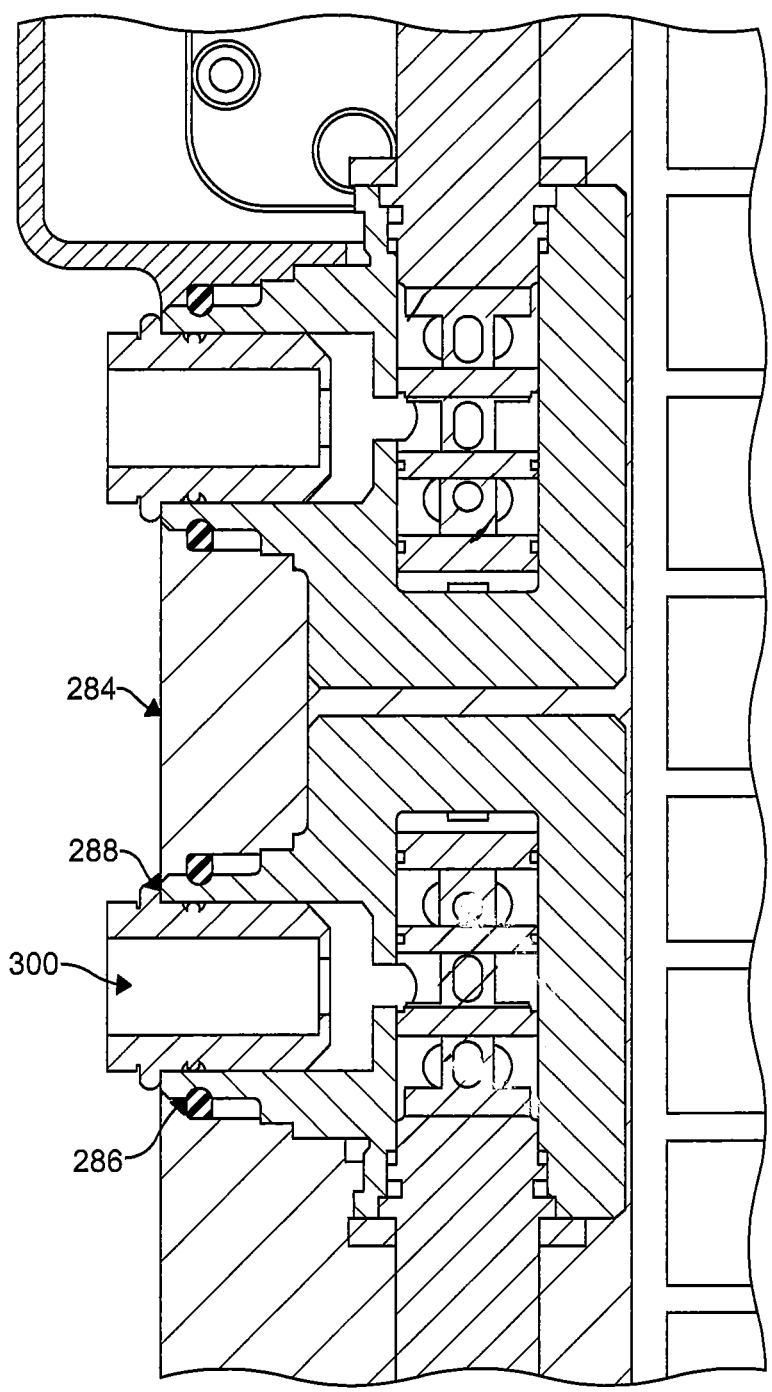
FIG. 16 is a cross-sectional view of the control unit of FIG. 9.
Figure 17:
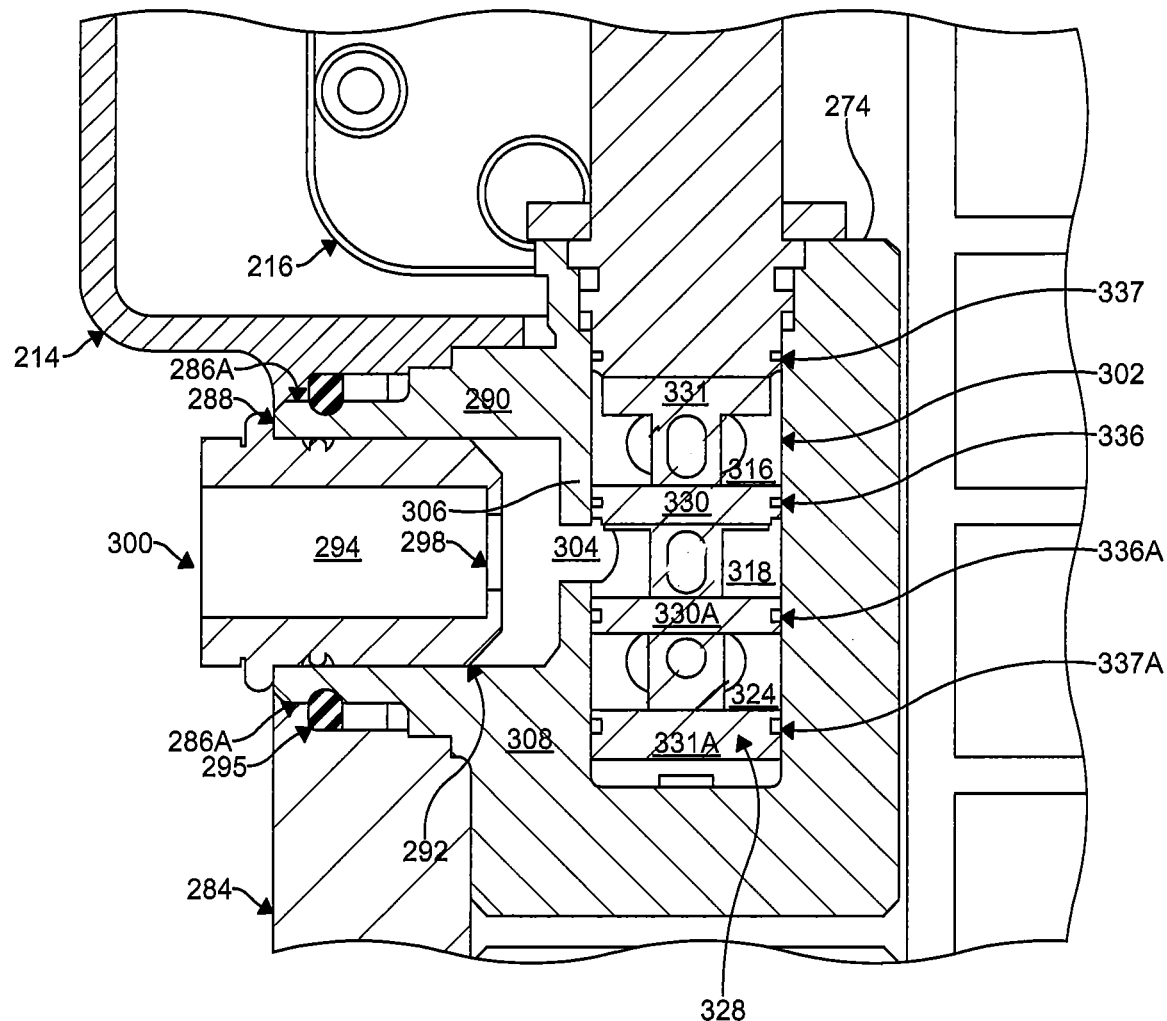
FIG. 17 is an enlarged view of the cross-sectional view of the control unit of FIG. 16.

Referring now to FIGS. 16-17, in one embodiment the second port 286 is of a generally cylindrical shape and is in a sealed relationship with a cover member 284 of the control unit housing 214. The second port 286 includes a wall member 290 which defines a cavity 292. The cavity 292 receives a module port insert 294. The second port 286 of the valve housing 274 extends into an opening 288 in the cover member 284 of the control unit housing 214. The module port insert 294 is a generally cylindrical-shaped member.

The module port insert 294 includes a retainer portion (not depicted) which defines an outer opening 300. The valve housing 274 is attached to the fluid control circuit 260 by inserting a portion of the fluid control circuit 260 through the outer opening 300 and by engagement of the retaining member with the portion of the fluid control circuit 260 inserted therein. The second port 286 may include a sealing member 295 located on the outer surface 286a of second port 286 to provide a seal between the channel valve assembly 236 and the cover member 284 of the control unit housing 214 as shown in FIG. 16. Preferably, the sealing member 295 is an O-ring.

Referring now to FIG. 17, the valve housing 274 also includes a valve cavity 302. The valve cavity 302 and the second port 286 are in fluid communication via a first fluid opening 304. The first fluid opening 304 is provided in a middle portion 306 of a sidewall 308 of the valve housing 274. The sidewall 308 partially defines the second port 286 and the valve cavity 302. The wall member 290 and the sidewall 308 are attached to each other in a perpendicular relationship such that the wall member 290 extends from the sidewall 308 toward the cover member 284.

The first fluid opening 304 enables fluid communication between the valve cavity 302 and the module port insert 294 and the other portions of the tire pressure management system 210 in fluid communication with the channel valve assembly 236. More particularly, on a side of the valve cavity 302, the first fluid opening 304 is in fluid communication with a middle chamber 310 provided in the valve cavity 302. On an opposite side of the valve cavity 302, the first fluid opening 304 is in fluid communication with the air passageway 298 provided through the module port insert 294.

Referring now to FIG. 12, the channel valve assembly 236 is also in fluid communication with the atmosphere via a second fluid opening 312. The first fluid opening 304 and second fluid opening 312 are in a perpendicular relationship with each other and are selectively in fluid communication. The second fluid opening 312 is provided in the valve housing 274 parallel and above first port 279. The second fluid opening 312 extends through the first side outer surface 275C of the valve housing 274.

The second fluid opening 312 enables fluid communication between the valve cavity 302 and the atmosphere. More particularly, on a side, the second fluid opening 312 is in fluid communication with an upper chamber 316 provided in the valve cavity 302. On an opposite side, the second fluid opening 312 is in fluid communication with the atmosphere via the chamber 256 formed in the control unit 212 between the system and the control unit housing 214. The chamber 256 is in fluid communication with the atmosphere via a vent passage 348, which is illustrated in FIG. 8.

Referring now to FIG. 12, in one embodiment the channel valve assembly 236 is selectively in fluid communication with the first fluid conduit 238 via a third fluid opening 320 and a fourth fluid opening 321. The third fluid opening 320 is in fluid connection with the first port 279. The first port 279 is generally cylindrical in shape and is capable of being inserted into a second connecting module port 219 of a connecting module 265 or second opening 281 of a second channel valve assembly. First port 279 may include a sealing member 285 to provide a seal between the first port 279 and either the connecting module 265 or second channel valve assembly. Preferably, the sealing member 285 is an O-ring. The third fluid opening 320 enables fluid communication between the valve cavity 302 and the source of pressurized air 244 via the first fluid conduit 238. More particularly, on a side, the third fluid opening 320 is in fluid communication with a lower chamber 324 provided in the valve cavity 302. On an opposite side, the third fluid opening 320 is in fluid communication with first port 279.

The fourth fluid opening 321 is in fluid connection with second opening 281. Second opening 281 is provided in a lower portion 341 of the valve housing 274 below attaching portion 280. Second opening 281 is capable of receiving first connecting module port 217 of connecting module 265 or a first port 279 of a second channel valve assembly in a seal relationship. Second opening 281 and first port 279 are parallel to each other. The fourth fluid opening 321 enables fluid communication between the valve cavity 302 and the first fluid conduit 338. More particularly, on a side of the valve cavity 302, the fourth fluid opening 321 is in fluid communication with a lower chamber 324 provided in the valve cavity 302. On an opposite side of the valve cavity 302, the fourth fluid opening 321 is in fluid communication with the second opening 281. The first fluid opening 304 is in selective fluid communication with the third fluid opening 320 and fourth fluid opening 321 via the lower chamber 324.

The first fluid opening 304 is perpendicular to the third and fourth fluid openings 320, 321.

Figure 15:
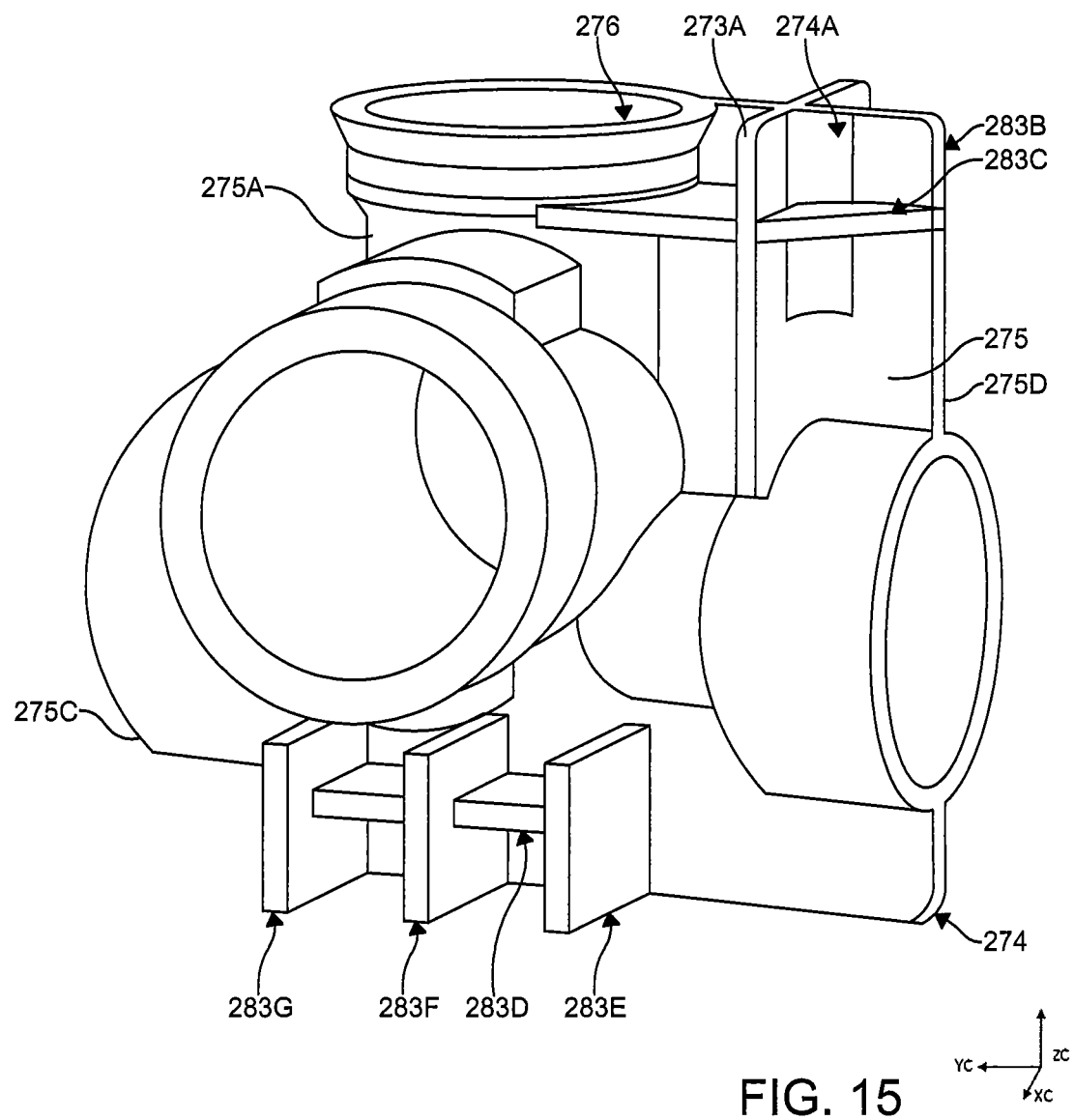
FIG. 15 is an isometric front view of the valve housing of FIG. 11.

Referring now to FIG. 15, in one embodiment the outer surface 275 of the valve housing 274 has at least one structural support element extending therefrom. In one embodiment, as illustrated in FIG. 15, structural support elements 283A, 283B, 283C, 283D, 283E, 283F, 283G protrude outward from the outer surface 275. The structural support elements 283A, 283B, 283C, 283D, 283E, 283F, 283G can be shaped as ribbing. The ribbing elements 283A, 283B, 283C, 283D, 283E, 283F, 283G provide structure to the valve housing 274. The ribbing elements 283A, 283B, 283C, 283D, 283E, 283F, 283G extend from and along the outer surface 275 such that a least a portion of the ribbing elements 283A, 283B, 283C, 283D, 283E, 283F, 283G are in direct contact with an inner surface of the control unit housing 214, additional channel valve assemblies and other components of the system 215 in a form-fitting manner.

The ribbing elements aid in supporting the channel valve assembly 236 and to provide a structure to the valve assembly system 215 such that the system 215 can fit within the control unit housing 214 securely without requiring additional fasteners to securing the system depicted in FIG. 11.

As depicted in FIG. 15, in one embodiment ribbing 283D, 283C extends horizontal in the direction of the XC axis to provide structure from which the front of the valve housing 274 which mates with the cover member 284 of the control unit housing 214. Similar ribbing (not pictured) extends in the opposite direction along the XC axis to provide support to the back of the system 215 which mates with the control unit housing 214. Ribbing 283A, 283B run vertically below the opening 276 and around the receiving portion 277 from outer surface 275 and are perpendicular to ribbing 283. Ribbing 283A, 283B provide support for the structure where the valve housing 274 mates against first port 279 of a different valve assembly or second connecting module port 219 of connecting module 265 as depicted in FIGS. 10 and 15. Ribbing 283E, 283F, 283G run vertically below second port 286 extending from the outer surface 283. Ribbing 283, 283F, 283G are parallel to each other and perpendicular to ribbing 283D. The ribbing 283B, 283C, 283D, 283E, 283F, 283G can be constructed in various arrangements such that the ribbing provides support and aids in mating the channel valve assemblies 236, connecting modules 265, 265A, and housing 214 to each other without the use of additional fasteners.

Referring now to FIG. 17, the valve cavity 302 is of a generally cylindrical shape. A valve cavity insert 328 is disposed within the valve cavity 302 to direct pressurized air through the valve cavity 302 and to and from the second port 286. The valve cavity insert 328 is in a sealed relationship with the valve housing 274 and partially defines the middle chamber 310, the upper chamber 316 and the lower chamber 324.

The valve cavity insert 328 includes one or more annular portions 330, 330A and one or more cylindrical portions 331, 331A. Each annular portion 330, 330A is attached to an adjacent annular portion by a wall portion and each annular portion 330, 330A is attached to one of the cylindrical portions 331, 331A by a wall portion. An aperture (not depicted) is provided through each annular portion 330, 330A to facilitate the movement of pressurized air through the valve cavity 302.

A sealing member is provided around each annular portion 330, 330A and each cylindrical portion 331, 331A. Preferably, each sealing member 336, 336A, 337, 337A is disposed in a groove and is ring-shaped. Preferably, each sealing member 336, 336A, 337, 337A is formed from an elastomeric material. In an embodiment, each sealing member 336, 336A, 337, 337A is an O-ring. Each sealing member 336, 336A, 337, 337A provides a seal between one of the annular portions 330, 330A or one of the cylindrical portions 331, 331A and an inner surface of a wall portion 308 which allows the valve cavity insert 328 to be in a sealed relationship with the valve housing 274.

As noted above, the channel valve assembly 236 also includes the middle chamber 310, the upper chamber 316, and the lower chamber 324. The upper chamber 316 is selectively in fluid communication with the atmosphere via the chamber 256 formed in the control unit 212 between the valve assembly system 215 and the control unit housing 214 via the second fluid opening 312. The second fluid opening 312 extends from the upper chamber 316 through the first side outer surface 275B of the valve housing 274. The chamber 256 is in fluid communication with the atmosphere via a vent passage 348 which is illustrated in FIG. 8. The upper chamber 316 is also selectively in fluid communication with the middle chamber 310. The upper chamber 316 is in fluid communication with the middle chamber 310 when, for example, it is desired to vent the fluid control circuit 260. As noted above, the lower chamber 324 is in fluid communication with the first fluid conduit 38 via the third fluid opening 320 and fourth fluid opening 321. The lower chamber 324 is also selectively in fluid communication with the middle chamber 310. The lower chamber 324 is in fluid communication with the middle chamber 310 when, for example, it is desired to measure, increase, and/or decrease the tire pressure.

The channel valve assembly 236 includes a biasing member (not depicted). The biasing member is attached to a poppet (not depicted). The poppet is moveable in response to the biasing member. The poppet moves between and seals against the annular portions 330, 330A of the valve cavity insert 328. The biasing member moves the poppet when the channel valve assembly 236 is energized or de-energized. In an embodiment, when a signal from the electronic control portion 216 is received by the solenoid valve 272, the biasing member urges the poppet toward the upper chamber 316. In another embodiment, when a signal from the electronic control portion 216 is not received by the solenoid valve 272, the biasing member urges the poppet toward the lower chamber 324.

When the biasing member urges the poppet toward the upper chamber 316, the poppet seals against an annular portion 330 of the valve cavity insert 328. When the poppet seals against the valve cavity insert 328, the lower chamber 324 is in fluid communication with the middle chamber 310. As noted above, the lower chamber 324 is in fluid communication with the middle chamber 310 to allow the tire pressure to be measured, increased, and/or decreased. When the biasing member urges the poppet toward the lower chamber 324, the poppet seals against another annular portion 330A of the valve cavity insert 328. When the poppet seals against the valve cavity insert 328, the upper chamber 316 is in fluid communication with the middle chamber 310. As noted above, the upper chamber 316 is in fluid communication with the middle chamber 310 to allow the fluid control circuit 260 to be vented.

As noted above and depicted in FIG. 8, the channel valve assembly 236 receives a signal from the electronic control portion 216. More particularly, the signal from the electronic control portion 216 is received by the solenoid valve 272. As noted above, the signal may be an electrical current which energizes the channel valve assembly 236 and places the channel valve assembly 236 in the open position. Similarly, the signal can be removed from the channel valve assembly 236 to de-energize the channel valve assembly 236 and place the channel valve assembly 236 in the closed position. For describing the tire pressure management system 210 provided herein, when an electrical current is received by the solenoid valve 272, the channel valve assembly 236 may be referred to as being "energized." When no electrical current is received by the solenoid valve 272 or when electrical current is removed from the solenoid valve 272, the channel valve assembly 236 may be referred to as being "de-energized." Preferably, the channel valve assembly 236 is normally de-energized and in the closed position.

When the channel valve assembly 236 is de-energized, the first fluid control circuit 260 is in fluid communication with the chamber 256. When the first fluid control circuit 260 is in fluid communication with the chamber 256 and if pressurized air is within the first fluid control circuit 260, venting the first fluid control circuit 260 occurs. The first fluid control circuit 260 is vented by directing a flow of pressurized air from the first fluid control circuit 260 through the channel valve assembly 236 into the atmosphere via the chamber 256 formed in the control unit 212 between the valve assembly system 125 and the control unit housing 214.

When the channel valve assembly 236 is energized, the first fluid conduit 238 is in fluid communication with the first fluid control circuit 260. When the first fluid conduit 38 is in fluid communication with the first fluid control circuit 260, pressurized air in the first fluid conduit 238 can be directed to the first fluid control circuit 260 to measure, increase, and/or decrease the tire pressure. Measuring, increasing, and/or decreasing the tire pressure is achieved by directing a flow of pressurized air from the first fluid conduit 238 to the first fluid control circuit 260.

Figure 13:
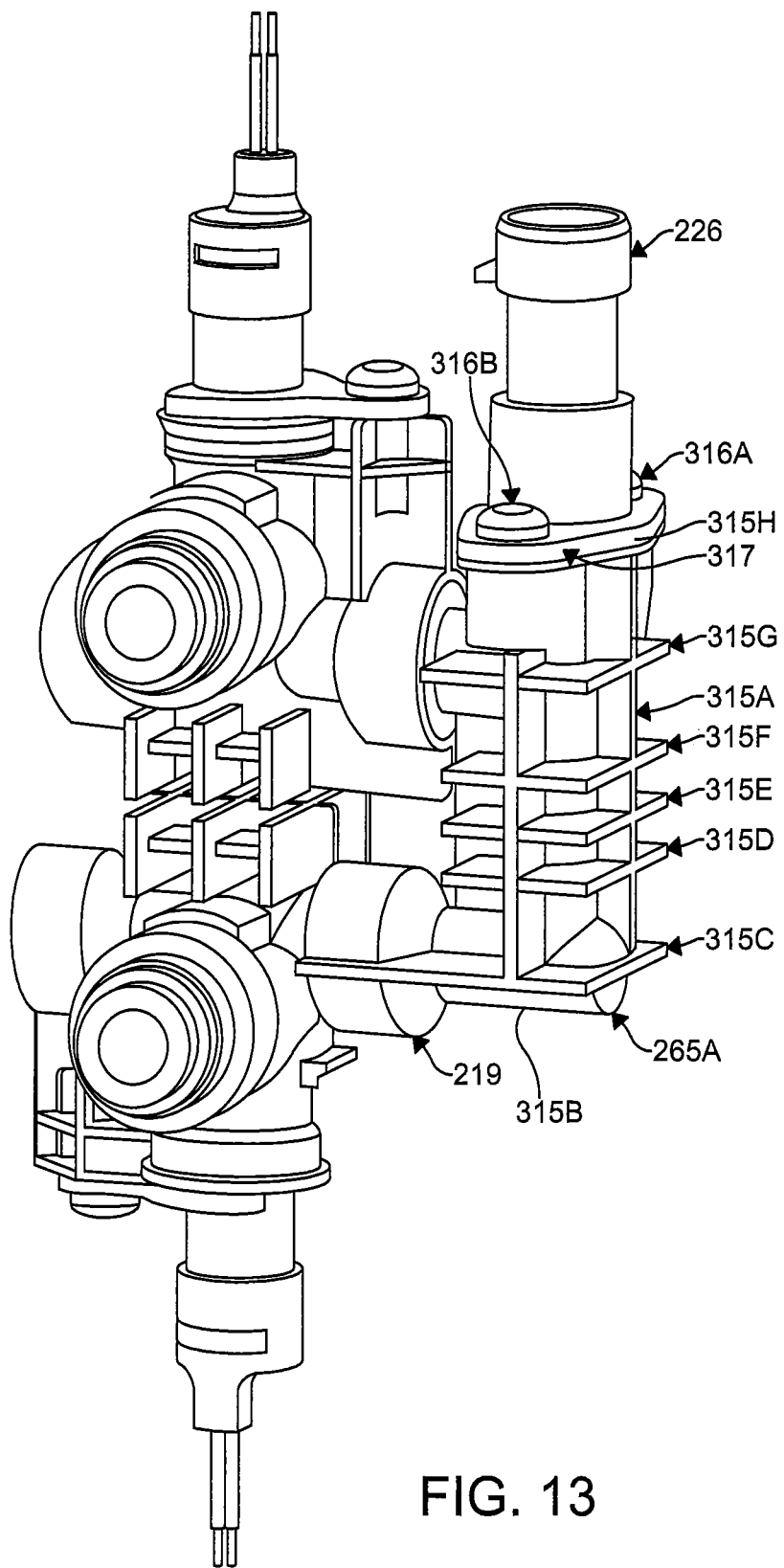
FIG. 13 is an isometric front view of an embodiment of two channel valve assemblies connected by a connecting module in accordance with the invention.
Figure 14:
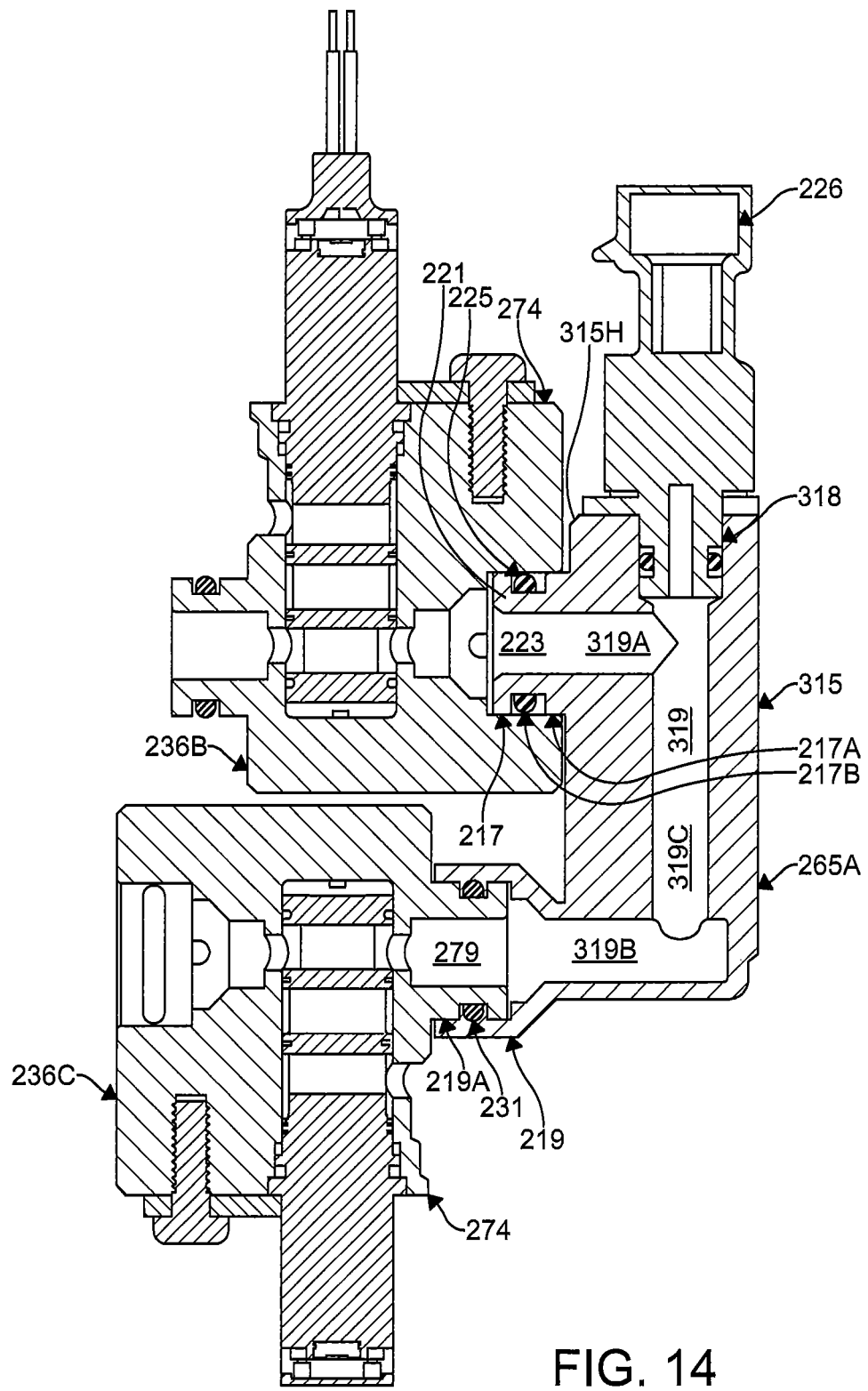
FIG. 14 is a cross-sectional view through the system of FIG. 13 depicting portions of two channel valve assemblies connected by the connecting module.

Referring now to FIGS. 10 and 13-14, in another preferred embodiment, the connecting module 265 connects two channel valve assemblies 236B, 236C. It is understood that the connecting module 265 can be used to connect any two of the channel valve assemblies 236, 236A, 236B, 236C, 236D, 236E. In another preferred embodiment, as depicted in FIG. 10, the control valve assembly 232 is connected to the supply valve assembly 234 via a second connecting module 265A. The connecting module 265 is selectively in fluid communication with the first fluid conduit 238. Connecting modules 265, 265A allow the channel valve assemblies 236, 236A, 236B, 236C, 236D, 236E to be arranged such that the channel valve assemblies can be stacked, as depicted in FIGS. 10 and 14, and remain in fluid communication with each other and the first fluid conduit 238. For example, as shown in FIG. 10, channel valve assembly 236 is stacked on top of channel valve assembly 236E such that the second ports 281 of each channel assembly face the same direction and the first openings 271 of each channel valve assembly extend in opposite directions. The stacked valve assembly arrangement allows additional valve assemblies to be added to the valve assembly system 215 while maintaining a compact arrangement in the control unit housing 214.

Preferably, connecting modules 265, 265A are formed in a unitary manner. More preferably, connecting modules 265, 265A are formed with a rigid polymeric material and from an injection molding process.

As depicted in FIGS. 13-14, connecting module 265 includes a first connecting module port 217 and a second connecting module port 219 in fluid communication with each other. In one embodiment, the connecting modules 265 is U-shaped with the first connecting module port 217 on one end thereof and the second connecting module port 219 on the other end thereof. The first connecting module port 217 connects to the valve housing 274 of the first channel valve assembly 236B. The first connecting module port 217 is of a generally cylindrical shape and is in a sealed relationship with the first channel valve assembly 236B. The first connecting module port 217 includes a wall member 221 which defines a cavity 223. The first connecting module port 217 is attached to the valve housing 274 by inserting the first connecting module port 217 in a second opening 281 of the first channel valve assembly 236B. The first connecting module port 217 may include a sealing member 225 located on the outer surface 217A of the first connecting module port 217 in a groove 217B to provide a seal between the first channel valve assembly 236B and the connecting module 265. Preferably, the sealing member 225 is an O-ring.

The second connecting module port 219 is connected to the valve housing 274 of second channel valve assembly 236C. The second connecting module port 219 is of a generally cylindrical shape and is in a sealed relationship with the second channel valve assembly 236C. The second connecting module port 219 includes a wall member 227 which defines a cavity 219A. The second connecting module port 219 is attached to the valve housing 274 by inserting a first port 279 of the second channel valve assembly 236C into the cavity 219A. The first port 279 of valve housing 274 may include a sealing member 231 to provide a seal between the valve housing 274 and the second connecting module port 219. Preferably, the sealing member 231 is an O-ring. The connecting module 265 has a conduit 319 that is part of the first fluid conduit 238 that fluidly connects the first channel valve assembly 236B to the second channel valve assembly 236C. In one embodiment, the conduit 319 includes two horizontal portion 319A, 319B connected to a vertical portion 319C.

In one embodiment, the connecting module 265 has an outer surface 315 that has at least one structural support element 315A, 315B, 315C, 315D, 315E, 315F, 315G, 315H extending therefrom. In one embodiment, the structural support elements 315A, 315B, 315C, 315D, 315E, 315F, 315G, 315H run vertically and horizontally from and along the outer surface 315 to provide structure to the connecting module 265 and allow the connecting module 265 to be held within the control unit housing 214 without requiring additional fasteners.

In one embodiment, the structural support elements 315A, 315B, 315C, 315D, 315E, 315F, 315G, 315H are shaped as ribbing elements. The ribbing elements 315A, 315B, 315C, 315D, 315E, 315F, 315G, 315H enhance the mechanical strength of the module. The ribbing elements 315A, 315B, 315C, 315D, 315E, 315F, 315G, 315H extend from and along the outer surface 315 such that a least a portion of the ribbing elements 315A, 315B, 315C, 315D, 315E, 315F, 315G, 315H are in direct contact with an inner surface of the control unit housing 214 and other components of the system 215 in a form-fitting manner.

Referring now to FIG. 13, in one embodiment ribbing 315A, 315B runs vertically along the outer surface 315 extending from and perpendicular to horizontal ribbing 315C to a top surface 315H of the connecting module 265. Ribbing 315C extends horizontally around the second connecting module port 219 of the connecting module 265 and the horizontal portion 319B of the conduit 319. Ribbing 315D, 315E, 315F extends horizontally around the outer surface of the vertical portion 319C of the conduit 319 of connecting module 265. Ribbing 315G extends horizontally around the first connecting module port 217 of the connecting module 265 and the horizontal portion 319A of the conduit 319.

The ribbing can be in various arrangements such that the ribbing provides support and aids in mating the channel valve assemblies 236, connecting modules 265, 265A, and housing 214 to each other without the use of additional fasteners.

As depicted in FIG. 13, the connecting module 265 has two attaching portions (not depicted) for receiving two fasteners 316A, 316B. The fasteners 316A, 316B can be used to hold a cover 317 on the top surface 315H of the connecting module 265 as shown in FIG. 14.

In certain embodiments, the connecting module 265 can include the pressure sensor 226 as depicted in FIGS. 10 and 14. The pressure sensor 226 fits inside a receiving portion 318 on the top surface 315H of the connecting module 265. The receiving portion 318 of the connecting module 265 is in fluid communication with conduit 319 and allows the pressure sensor 226 to be in fluid communication with the first fluid conduit 238. The pressure sensor 226 measures the pressure of the air within the first fluid conduit 238. Thus, when the source of pressurized air 244 is in fluid communication with the first fluid conduit 238, the pressure sensor 226 can measure the pressure of the air from the source of pressurized air 244 by measuring the pressure of the air in the first fluid conduit 238. Also, during certain operations, the pressure sensor 226 may measure the pressure of the air in a fluid control circuit 260, 260A, 260B, 260C, 260D, 260E by measuring the pressure of the air in the first fluid conduit 238. Once the pressure of the air in the first fluid conduit 238 has been measured, the pressure sensor 226 can send a signal to the electronic control portion 216. The pressure sensor 226 is provided within the control unit housing 214.

As described above, the first fluid conduit 238 is in fluid communication with the pressure sensor 226, control valve assembly 232 and supply valve assembly 234. Also, as described above, the first fluid conduit 238 is selectively in fluid communication with the atmosphere via the chamber 256 formed in the control unit 212 between the valve assembly system 215 and the control unit housing 214. The chamber 256 is in fluid communication with the atmosphere via a vent passage 348, which is illustrated in FIG. 8. The first fluid conduit 238 is also attached to and in fluid communication with one or more channel valve assemblies 236, 236A, 236B, 236C, 236D, 236E and connecting modules 265, 265A.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

We claim:

1. A channel valve assembly for a tire pressure management system, comprising:
    a valve housing including a front outer surface, a rear outer surface, a first side outer surface and a second side outer surface, a first opening, a first port, a second opening, a second port and a valve cavity, wherein each of the first opening, the first port, the second opening and the second port are in fluid communication with the valve cavity,
- wherein the valve cavity includes an upper chamber, a lower chamber and a middle chamber,
- wherein the first port extends from the first side outer surface, the second opening extends from the second side outer surface and the first port and the second opening are parallel to each other,
- wherein the second port extends from the front outer surface of the valve housing and is perpendicular to the first opening, the second opening and the first port,
- wherein the valve cavity is in communication with a fluid conduit through the first port and the second opening and is in selective communication with a source of pressurized air through the second port, and
- wherein at least one of the front outer surface, the rear outer surface and the first and second side outer surfaces of the valve housing include structural support elements that extend therefrom; and
- a solenoid valve positioned within the valve cavity and extending through the first opening,
- wherein the lower chamber is in selective fluid communication with the first port, the second opening and the middle chamber,
- wherein the middle chamber is in selective fluid communication with the upper chamber, the lower chamber, and the second port, and
- wherein the upper chamber is in selective fluid communication with the middle chamber and atmosphere.

2. The channel valve assembly of claim 1, wherein the valve housing and the structural support elements are formed in a unitary manner.

3. The channel valve assembly of claim 1, wherein the channel valve assembly is of a three-way variety.

4. The channel valve assembly of claim 1, wherein the solenoid valve is secured to the valve housing by an attaching portion placed around the solenoid valve on an outer surface of the valve housing and a fastener that extends through the attaching portion and into a receiving portion in the valve housing.

5. The channel valve assembly of claim 1, wherein the structural support elements are ribbing elements.

6. A valve assembly system, comprising:
- at least two channel valve assemblies of claim 1, wherein the at least two channel valve assemblies are connected to a connecting module to allow fluid communication between the at least two channel valve assemblies,
- wherein the connecting module includes an outer surface, a first connecting module port and a second connecting module port in fluid communication with each other, and a cavity including a conduit that is part of the fluid conduit extending from the first connecting module port to the second connecting module port,
- wherein the first connecting module port connects to the second opening of a first channel valve assembly and the second connecting module port connects to the first port of a second channel valve assembly, and
- wherein the outer surface of the connecting module includes structural support elements that extend therefrom.

7. The valve assembly system of claim 6, wherein the connecting module is U-shaped and wherein the first connecting module port is positioned on one end thereof and the second connecting module port is positioned on the other end thereof.

8. The valve assembly system of claim 6, wherein the connecting module and structural support elements are formed in a unitary manner.

9. The valve assembly system of claim 6, wherein the structural support elements are ribbing elements.

10. The valve assembly system of claim 6, further comprising a pressure sensor positioned in a receiving portion of the connecting module and connected to an electronic control portion, wherein the receiving portion of the connecting module is in fluid communication with the fluid conduit and the pressure sensor is in fluid communication with the fluid conduit.

11. The valve assembly system of claim 6, further comprising:
- a supply valve assembly, a control valve assembly and a second connecting module, wherein the control valve assembly is connected to a first of the at least two channel valve assemblies and the supply valve assembly is connected to a second of the at least two channel valve assemblies,
- wherein the second connecting module is connected to the control valve assembly and the supply valve assembly, and
- wherein the at least two channel valve assemblies, the supply valve assembly, the control valve assembly and the first and second connecting modules are in fluid communication with the fluid conduit.

12. A tire pressure management system, comprising:
- a control unit comprising a control unit housing, an electronic control portion, and a pneumatic control portion including the valve assembly system of claim 11, wherein the valve assembly system is positioned inside the control unit housing;
- an air supply circuit in selective fluid communication with a source of pressurized air and the supply valve assembly; and
- at least one wheel assembly including a tire and a wheel rim, wherein each wheel assembly is in selective fluid communication with one of the at least two channel valve assemblies,
- wherein the fluid conduit is in selective fluid communication with the source of pressurized air, and
- wherein at least a portion of the structural support elements on the at least two channel valve assemblies and the connecting module are in direct contact an inner surface of the control unit housing.

13. A tire pressure management system, comprising:
- a control unit comprising a control unit housing, an electronic control portion, and a pneumatic control portion including a channel valve assembly, the channel valve assembly comprising:
  - a valve housing including a front outer surface, a rear outer surface, a first side outer surface and a second side outer surface, a first opening, a first port, a second opening, a second port and a valve cavity, wherein each of the first opening, the first port, the second opening and the second port are in fluid communication with the valve cavity,
  - wherein the first port extends from the first side outer surface, the second opening extends from the second side outer surface and the first port and the second opening are parallel to each other, wherein the second port extends from the front outer surface of the valve housing and is perpendicular to the first opening, the second opening and the first port, wherein the valve cavity is in communication with a fluid conduit through the first port and the second opening and is in selective communication with a source of pressurized air through the second port, and wherein at least one of the front outer surface, the rear outer surface and first and second side outer surfaces of the valve housing include structural support elements that extend therefrom; and a solenoid valve positioned within the valve cavity and extending through the first opening, wherein the channel valve assembly is positioned inside the control unit housing;

an air supply circuit in selective fluid communication with a source of pressurized air and the valve cavity; and a wheel assembly including a tire and a wheel rim, wherein the wheel assembly is in selective fluid communication with the channel valve assembly;

wherein the fluid conduit is in selective fluid communication with the source of pressurized air, and wherein at least a portion of the structural support elements on the channel valve assembly is in direct contact with an inner surface of the control unit housing.

14. The tire pressure management system of claim 13, wherein the second port extends into an opening in the control unit housing and includes a sealing member located around an outer surface of the second port and between the second port and the control unit housing.

15. A channel valve assembly for a tire pressure management system, comprising:
a valve housing including a first opening, a first port, a second opening, a second port and a valve cavity, the valve cavity including an upper chamber, a lower chamber and a middle chamber, and the valve cavity in communication with a fluid conduit through the first port, the second opening in selective communication with a source of pressurized air through the second port, the lower chamber in selective fluid communication with the first port, the second opening and the middle chamber, the middle chamber in selective fluid communication with the upper chamber, the lower chamber, and the second port, and the upper chamber in selective fluid communication with the middle chamber and the atmosphere; and a solenoid valve positioned within the valve cavity and extending through the first opening.

16. The channel valve assembly of claim 15, wherein the valve housing includes structural support elements extending therefrom.

17. The channel valve assembly of claim 15, wherein the first port extends from a first side outer surface, the second opening extends from a second side outer surface and the first port and the second opening are parallel to each other, and wherein the second port extends from a third outer surface and is perpendicular to the first opening, the second opening and the first port.

18. The channel valve assembly of claim 15, wherein a valve cavity insert within the valve cavity partially defines the upper chamber, the lower chamber and the middle chamber.

19. A valve assembly system, comprising:
at least two channel valve assemblies of claim 15, wherein the at least two channel valve assemblies are connected to a U-shaped connecting module, and a first port of the connecting module connects to the second opening of a first channel valve assembly and a second port of the connecting module connects to the first port of a second channel valve assembly.

* * * * *